(12) United States Patent
Arise et al.

(10) Patent No.: US 10,777,844 B2
(45) Date of Patent: *Sep. 15, 2020

(54) NONAQUEOUS ELECTROLYTE SECONDARY BATTERY

(71) Applicant: Sumitomo Chemical Company, Limited, Tokyo (JP)

(72) Inventors: Ichiro Arise, Osaka (JP); Toshihiko Ogata, Osaka (JP); Junji Suzuki, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 31 days.

This patent is subject to a terminal disclaimer.

(21) Appl. No.: 16/223,651

(22) Filed: Dec. 18, 2018

(65) Prior Publication Data

US 2019/0190061 A1 Jun. 20, 2019

(30) Foreign Application Priority Data

Dec. 19, 2017 (JP) ................................ 2017-243277

(51) Int. Cl.
| | | |
|---|---|---|
| *H01M 10/0525* | (2010.01) | |
| *H01M 4/48* | (2010.01) | |
| *H01M 10/48* | (2006.01) | |
| *H01M 2/18* | (2006.01) | |
| *H01M 2/16* | (2006.01) | |
| *H01M 4/583* | (2010.01) | |
| *H01M 10/0585* | (2010.01) | |

(52) U.S. Cl.
CPC ......... *H01M 10/0525* (2013.01); *H01M 2/16* (2013.01); *H01M 2/1653* (2013.01);
(Continued)

(58) Field of Classification Search
CPC .... H01M 10/525; H01M 2/16; H01M 2/1653; H01M 2/1686; H01M 2/18; H01M 4/48;
(Continued)

(56) References Cited

U.S. PATENT DOCUMENTS

| 2013/0089770 A1 | 4/2013 | Nishikawa |
| 2017/0155113 A1 | 6/2017 | Hashiwaki et al. |

(Continued)

FOREIGN PATENT DOCUMENTS

| JP | 2005222773 A | 8/2005 |
| JP | 2012104422 A | 5/2012 |

(Continued)

OTHER PUBLICATIONS

Office Action dated Apr. 3, 2018 in JP Application No. 2017243277 (Partial English Translation).

(Continued)

*Primary Examiner* — Helen Oi K Conley
(74) *Attorney, Agent, or Firm* — Panitch Schwarze Belisario & Nadel LLP

(57) ABSTRACT

The present invention provides a nonaqueous electrolyte secondary battery containing (i) a separator containing a polyolefin porous film, (ii) a porous layer containing a polyvinylidene fluoride-based resin, (iii) a positive electrode plate having a capacitance falling within a certain range, and (iv) a negative electrode plate having a capacitance falling within a certain range, the polyvinylidene fluoride-based resin containing an α-form polyvinylidene fluoride-based resin in an amount of not less than 35.0 mol %.

6 Claims, 2 Drawing Sheets

(52) U.S. Cl.
CPC ........... *H01M 2/1686* (2013.01); *H01M 2/18* (2013.01); *H01M 4/48* (2013.01); *H01M 4/583* (2013.01); *H01M 10/0585* (2013.01); *H01M 10/48* (2013.01)

(58) Field of Classification Search
CPC ... H01M 4/583; H01M 10/0585; H01M 10/48
See application file for complete search history.

(56) References Cited

U.S. PATENT DOCUMENTS

| | | |
|---|---|---|
| 2017/0263905 A1 | 9/2017 | Ogata et al. |
| 2017/0365835 A1 | 12/2017 | Ogata et al. |
| 2017/0365836 A1 | 12/2017 | Ogata et al. |

FOREIGN PATENT DOCUMENTS

| | | | |
|---|---|---|---|
| JP | 2012256528 A | 12/2012 | |
| JP | 5432417 B2 | 3/2014 | |
| JP | 201671969 A | 5/2016 | |
| JP | 6025957 B1 | 11/2016 | |
| JP | 2017103041 A | 6/2017 | |
| JP | 2017103209 A | 6/2017 | |
| JP | 2017168419 A | 9/2017 | |
| JP | 2017226117 A | 12/2017 | |
| JP | 2017226120 A | 12/2017 | |

OTHER PUBLICATIONS

Office Action dated Apr. 3, 2018 in JP Application No. 2017243284 (Partial English Translation).

NONAQUEOUS ELECTROLYTE SECONDARY BATTERY

This Nonprovisional application claims priority under 35 U.S.C. § 119 on Patent Application No. 2017-243277 filed in Japan on Dec. 19, 2017, the entire contents of which are hereby incorporated by reference.

TECHNICAL FIELD

The present invention relates to a nonaqueous electrolyte secondary battery.

BACKGROUND ART

Nonaqueous electrolyte secondary batteries, particularly lithium secondary batteries, have a high energy density and are therefore in wide use as batteries for personal computers, mobile phones, mobile information terminals, and the like. Such nonaqueous electrolyte secondary batteries have recently been developed as on-vehicle batteries.

For example, Patent Literature 1 discloses a nonaqueous electrolyte secondary battery containing (i) a polyolefin porous film and (ii) a porous layer containing a polyvinylidene fluoride-based resin.

CITATION LIST

Patent Literature

[Patent Literature 1]
Japanese Patent No. 5432417 (Registration No. Dec. 13, 2013)

SUMMARY OF INVENTION

Technical Problem

However, conventional nonaqueous electrolyte secondary batteries as described above have room for improvement in terms of a charge capacity after high-rate discharge. That is, there have been demands for improvement in charge capacity characteristic of nonaqueous electrolyte secondary batteries after high-rate discharge.

An object of an aspect of the present invention is to achieve a nonaqueous electrolyte secondary battery which has an excellent charge capacity characteristic after high-rate discharge.

Solution to Problem

A nonaqueous electrolyte secondary battery in accordance with Aspect 1 of the present invention includes: a nonaqueous electrolyte secondary battery separator containing a polyolefin porous film; a porous layer containing a polyvinylidene fluoride-based resin; a positive electrode plate having a capacitance of 1 nF to 1000 nF per measurement area of 900 mm$^2$; and a negative electrode plate having a capacitance of 4 nF to 8500 nF per measurement area of 900 mm$^2$, the porous layer being provided between the nonaqueous electrolyte secondary battery separator and at least one of the positive electrode plate and the negative electrode plate, and the polyvinylidene fluoride-based resin containing an α-form polyvinylidene fluoride-based resin in an amount of not less than 35.0 mol % with respect to 100 mol % of a total amount of (i) the α-form polyvinylidene fluoride-based resin and (ii) a β-form polyvinylidene fluoride-based resin contained in the polyvinylidene fluoride-based resin, where the amount of α-form polyvinylidene fluoride-based resin contained is calculated from (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum.

A nonaqueous electrolyte secondary battery in accordance with Aspect 2 of the present invention is, in Aspect 1, configured so that the positive electrode plate contains a transition metal oxide.

A nonaqueous electrolyte secondary battery in accordance with Aspect 3 of the present invention is, in Aspect 1 or 2, configured so that the negative electrode plate contains graphite.

The nonaqueous electrolyte secondary battery in accordance with Aspect 4 of the present invention is, in any one of Aspects 1 through 3, configured so as to further include: another porous layer which is provided between (i) the nonaqueous electrolyte secondary battery separator and (ii) at least one of the positive electrode plate and the negative electrode plate.

A nonaqueous electrolyte secondary battery in accordance with Aspect 5 of the present invention is, in any Aspect 4, configured so that the another porous layer contains at least one resin selected from the group consisting of a polyolefin, a (meth)acrylate-based resin, a fluorine-containing resin (excluding a polyvinylidene fluoride-based resin), a polyamide-based resin, a polyester-based resin, and a water-soluble polymer.

A nonaqueous electrolyte secondary battery in accordance with Aspect 6 of the present invention is, in Aspect 5, configured so that the polyamide-based resin is an aramid resin.

Advantageous Effects of Invention

With an aspect of the present invention, it is possible to achieve a nonaqueous electrolyte secondary battery having an excellent charge capacity characteristic after high-rate discharge.

DESCRIPTION OF EMBODIMENTS

Figure 1:
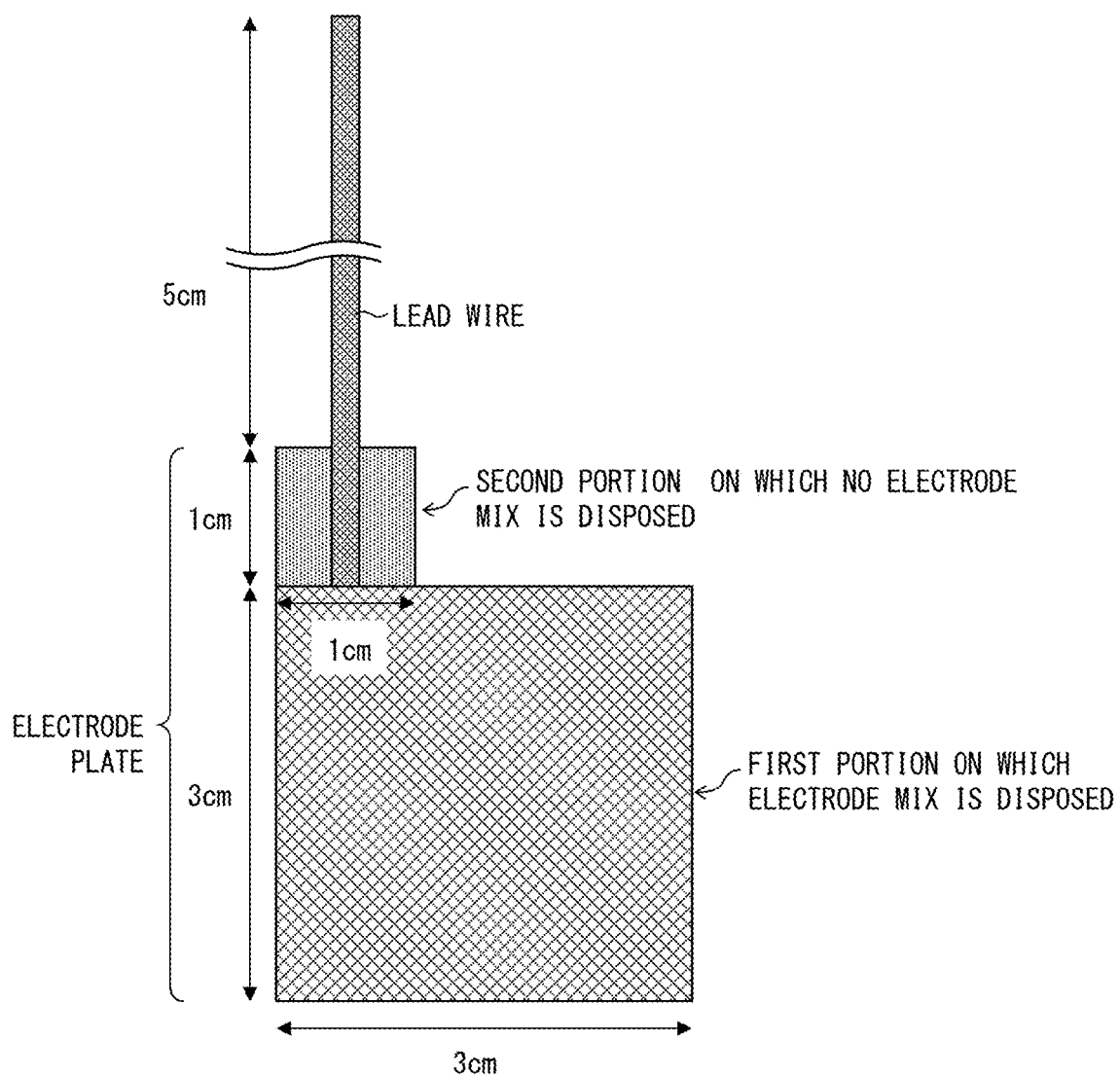
FIG. 1 is a view schematically illustrating a measurement target electrode whose capacitance was to be measured in Examples of the present application.

The following description will discuss an embodiment of the present invention. The present invention is, however, not limited to such an embodiment. Further, the present invention is not limited to the description of the arrangements below, but may be altered in various ways by a skilled person within the scope of the claims. Any embodiment based on a proper combination of technical means disclosed in different embodiments is also encompassed in the technical scope of the present invention. Any numerical range expressed as "A to B" herein means "not less than A and not more than B" unless otherwise stated.

A nonaqueous electrolyte secondary battery in accordance with an embodiment of the present invention contains: a nonaqueous electrolyte secondary battery separator (hereinafter also referred to as "separator") containing a polyolefin porous film (hereinafter also referred to as "porous film"); a porous layer containing a polyvinylidene fluoride-based resin (hereinafter also referred to as "PVDF-based resin"); a positive electrode plate having a capacitance of 1 nF to 1000 nF per measurement area of 900 mm$^2$; and a negative electrode plate having a capacitance of 4 nF to 8500 nF per measurement area of 900 mm$^2$, the porous layer being provided between the nonaqueous electrolyte secondary battery separator and at least one of the positive electrode plate and the negative electrode plate, and the polyvinylidene fluoride-based resin containing an α-form polyvinylidene fluoride-based resin in an amount of not less than 35.0 mol % with respect to 100 mol % of a total amount of (i) the α-form polyvinylidene fluoride-based resin and (ii) a β-form polyvinylidene fluoride-based resin contained in the polyvinylidene fluoride-based resin, where the amount of α-form polyvinylidene fluoride-based resin contained is calculated from (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum.

The term "measurement area" herein means an area of a portion of a measurement electrode (an upper (main) electrode or a probe electrode) of an LCR meter which portion is in contact with a measurement target (a positive electrode plate, or a negative electrode plate) in a case where a capacitance is measured by a method of measuring a capacitance (described later). Therefore, a value of a capacitance per measurement area of X mm$^2$ means a value obtained in a case where a capacitance is measured with use of an LCR meter while a measurement target and a measurement electrode are in contact with each other such that an area of a portion of the measurement electrode which portion is in contact with the measurement target is X mm$^2$.

<Capacitance>

In the present invention, a value of a capacitance of a positive electrode plate is a value measured by a method of measuring a capacitance of an electrode plate (described later), that is, a value measured while an electrode for measurement (probe electrode, hereinafter referred to as "measurement electrode") is in contact with a surface of the positive electrode plate which surface is located on a positive electrode active material layer side. The capacitance of the positive electrode plate mainly indicates a polarization state of a positive electrode active material layer of the positive electrode plate.

Furthermore, in the present invention, a value of a capacitance of a negative electrode plate is a value measured by the method of measuring a capacitance of an electrode plate (described later), that is, a value measured while a measurement electrode is in contact with a surface of the negative electrode plate which surface is located on a negative electrode active material layer side. The capacitance of the negative electrode plate mainly indicates a polarization state of a negative electrode active material layer of the negative electrode plate.

In a case where a nonaqueous electrolyte secondary battery is discharged, ions serving as charge carriers are released from a negative electrode plate. The ions thus released pass through a nonaqueous electrolyte secondary battery separator, and are then taken into a positive electrode plate. In this case, the ions are (i) solvated, by an electrolyte solvent, in the negative electrode plate or on a surface of the negative electrode plate and (ii) desolvated in a positive electrode plate or on a surface of the positive electrode plate. Note that the ions are Li$^+$ in a case where the nonaqueous electrolyte secondary battery is, for example, a lithium ion secondary battery.

Therefore, a degree to which the ions are solvated is affected by the polarization state of the negative electrode active material layer of the negative electrode plate. A degree to which the ions are desolvated is affected by the polarization state of the positive electrode active material layer of the positive electrode plate.

Therefore, the solvation and the desolvation can be promoted by controlling the capacitances of the negative electrode plate and the positive electrode plate to each fall within a suitable range, that is, by controlling the negative electrode active material layer and the positive electrode active material layer each to be in a suitable polarization state. This allows for improvement in (i) a permeability of ions serving as charge carriers and (ii) a discharge output characteristic of the nonaqueous electrolyte secondary battery especially in a case where a large electric current is applied at a rate of not less than 10 C. In view of the above, the negative electrode plate of a nonaqueous electrolyte secondary battery in accordance with an embodiment of the present invention has a capacitance of 4 nF to 8500 nF, preferably 4 nF to 3000 nF, and more preferably 4 nF to 2600 nF, per measurement area of 900 mm$^2$. Note that a lower limit value of the capacitance can be not less than 100 nF, not less than 200 nF, or not less than 1000 nF, per measurement area of 900 mm$^2$.

Specifically, in a case where the negative electrode plate has a capacitance of less than 4 nF per measurement area of 900 mm$^2$, polarizability of the negative electrode plate is so low that the capacitance hardly contributes to promotion of the solvation above. Therefore, according to a nonaqueous electrolyte secondary battery including such a negative electrode plate, there is no improvement in output characteristic. Meanwhile, in a case where the negative electrode plate has a capacitance of more than 8500 nF per measurement area of 900 mm$^2$, the polarizability of the negative electrode plate is excessively high. This causes an excessive increase in compatibility between (i) inner walls of voids in the negative electrode plate and (ii) ions. This prevents the ions from moving (being released) from the negative electrode plate. Therefore, according to a nonaqueous electrolyte secondary battery including such a negative electrode plate, the output characteristic rather deteriorates.

In view of the above, the positive electrode plate of the nonaqueous electrolyte secondary battery in accordance with an embodiment of the present invention has a capacitance of 1 nF to 1000 nF, preferably 2 nF to 600 nF, and more preferably 2 nF to 400 nF, per measurement area of 900 mm$^2$. Note that the lower limit value of the capacitance can be not less than 3 nF per measurement area of 900 mm$^2$.

Specifically, in a case where the positive electrode plate has a capacitance of less than 1 nF per measurement area of 900 mm$^2$, polarizability of the positive electrode plate is so low that the capacitance hardly contributes to promotion of the desolvation above. Therefore, according to a nonaqueous electrolyte secondary battery including such a positive electrode plate, there is no improvement in output characteristic. Meanwhile, in a case where the positive electrode plate has a capacitance of more than 1000 nF per measurement area of 900 mm$^2$, the polarizability of the positive electrode plate is excessively high. This causes excessive promotion of the desolvation. Therefore, the solvent for the ions to move inside the positive electrode plate is desolvated, and there is excessively high compatibility between (i) inner walls of voids in the positive electrode plate and (ii) the ions which have been desolvated. This prevents movement of the ions inside the positive electrode plate. Therefore, according to a nonaqueous electrolyte secondary battery including such a positive electrode plate, the output characteristic rather deteriorates.

<Method of Adjusting Capacitance>

It is possible to control the capacitance of the positive electrode plate by adjusting a surface area of the positive electrode active material layer. It is also possible to control the capacitance of the negative electrode plate by adjusting a surface area of the negative electrode active material layer. Specifically, by, for example, smoothing surfaces of the positive electrode active material layer and the negative electrode active material layer with use of sandpaper or the like, it is possible to increase the surface areas of the positive electrode active material layer and the negative electrode active material layer. This makes it possible to increase the capacitance. Alternatively, it is possible to control the capacitance of the positive electrode plate by adjusting a relative permittivity of a material of which the positive electrode plate is made, and it is possible to control the capacitance of the negative electrode plate by adjusting a relative permittivity of a material of which the negative electrode plate is made. The relative permittivity can be adjusted by changing shapes of the voids, a porosity, and distribution of the voids of each of the positive electrode plate and the negative electrode plate. The relative permittivity can be alternatively controlled by adjusting the material of which each of the positive electrode plate and the negative electrode plate is made.

<Method of Measuring Capacitance of Electrode Plate>

According to an embodiment of the present invention, the capacitance of each of the positive electrode plate and the negative electrode plate (hereinafter each also referred to as an electrode plate) per measurement area of 900 mm$^2$ is measured with use of an LCR meter. Measurement is carried out at a frequency of 300 KHz while measurement conditions are set as follows: CV: 0.010 V, SPEED: SLOW2, AVG: 8, CABLE: 1 m, OPEN: All, SHORT: All DCBIAS 0.00 V.

In measurement of the capacitance, the capacitance is that of the electrode plate which has not been included in a nonaqueous electrolyte secondary battery. Meanwhile, a value of a capacitance is a unique value determined depending on, for example, (i) a shape (surface area) of a solid insulating material (electrode plate), (ii) a material of which the solid insulating material is made, (iii) shapes of voids in the solid insulating material, (iv) a porosity of the solid insulating material, and (v) distribution of the voids. Therefore, the value of the capacitance of the electrode plate which has been included in the nonaqueous electrolyte secondary battery, is equivalent to that of the capacitance of the electrode plate which has not been included in the nonaqueous electrolyte secondary battery.

Note that the capacitance of each of the positive electrode plate and the negative electrode plate can be measured after (i) the positive electrode plate and the negative electrode plate are included in the nonaqueous electrolyte secondary battery, (ii) the nonaqueous electrolyte secondary battery are charged and discharged, and then (iii) the positive electrode plate and the negative electrode plate are taken out from the nonaqueous electrolyte secondary battery. Specifically, for example, an electrode laminated body (a member for a nonaqueous electrolyte secondary battery (hereinafter referred to as a "nonaqueous electrolyte secondary battery member")) is taken out from an external member of the nonaqueous electrolyte secondary battery, and is dismantled to take out one electrode plate (the positive electrode plate or the negative electrode plate). From the one electrode plate thus taken out, a piece is cut off, which has a size similar to that of the electrode plate serving as a measurement target in the above-described method of measuring a capacitance of an electrode plate. This produces a test piece. Subsequently, the test piece is cleaned several times (for example, three times) in diethyl carbonate (hereinafter also referred to as "DEC"). The cleaning is a step in which an electrolyte, a product of decomposition of the electrolyte, a lithium salt, and the like, each stuck to a surface of the electrode plate, are removed by (i) putting and cleaning the test piece in the DEC and then (ii) repeating, several times (for example, three times), a procedure of replacing the DEC with new DEC and cleaning the test piece in the new DEC. The electrode plate which has been cleaned is sufficiently dried, and is then used as a measurement target. There is no limitation on (i) a type of the external member of the nonaqueous electrolyte secondary battery from which the external member the electrode laminated body is taken out or (ii) a structure of the electrode laminated body from which the electrode plate is taken out.

<Nonaqueous Electrolyte Secondary Battery Separator>

The nonaqueous electrolyte secondary battery separator in accordance with an embodiment of the present invention includes a polyolefin porous film.

The porous film by itself can serve as a nonaqueous electrolyte secondary battery separator. The porous film can also serve as a base material of a laminated separator for a nonaqueous electrolyte secondary battery (hereinafter referred to as a "nonaqueous electrolyte secondary battery laminated separator") in which a porous layer (described later) is disposed. The porous film contains a polyolefin as a main component, and has therein many pores connected to one another, so that a gas, a liquid, or the like can pass through the porous film from one surface to the other.

On at least one surface of the nonaqueous electrolyte secondary battery separator in accordance with an embodiment of the present invention, a porous layer containing a polyvinylidene fluoride-based resin (described later) can be disposed. In such a case, a laminated body obtained by disposing the porous layer on the at least one surface of the nonaqueous electrolyte secondary battery separator is herein also referred to as "nonaqueous electrolyte secondary battery laminated separator". Hereinafter, the nonaqueous electrolyte secondary battery laminated separator is also referred to as "laminated separator". The nonaqueous electrolyte secondary battery separator in accordance with an embodiment of the present invention can further contain another layer in addition to the polyolefin porous film. Examples of the another layer encompass an adhesive layer, a heat-resistant layer, and a protective layer.

(Nonaqueous Electrolyte Secondary Battery Laminated Separator)

The nonaqueous electrolyte secondary battery laminated separator, which is an example of the nonaqueous electrolyte secondary battery separator included in the nonaqueous electrolyte secondary battery in accordance with an embodiment of the present invention, will be described below.

(Polyolefin Porous Film)

The polyolefin porous film can be a base material for a nonaqueous electrolyte secondary battery laminated separator. The polyolefin porous film contains a polyolefin as a main component. The polyolefin porous film has therein many pores which are connected to one another, so that a gas, a liquid, or the like can pass through the polyolefin porous film from one surface to the other.

A polyolefin contained in the porous film accounts for not less than 50% by volume, preferably not less than 90% by volume, and more preferably not less than 95% by volume, of the entire porous film. The polyolefin more preferably contains a high molecular weight component having a weight-average molecular weight of $5 \times 10^5$ to $15 \times 10^6$. In particular, the polyolefin more preferably contains a high molecular weight component having a weight-average molecular weight of not less than 1,000,000 because such a high molecular weight component content causes an increase in strength of the nonaqueous electrolyte secondary battery separator.

Specific examples of the polyolefin, which is a thermoplastic resin, encompass a homopolymer and a copolymer, each of which is produced through (co)polymerization of a monomer(s) such as ethylene, propylene, 1-butene, 4-methyl-1-pentene, and/or 1-hexene. Examples of the homopolymer encompass polyethylene, polypropylene, and polybutene. Examples of the copolymer encompass an ethylene-propylene copolymer.

Among these, polyethylene is more preferable because it is possible (shut down) a flow of an excessively large electric current at a lower temperature. Examples of the polyethylene encompass low-density polyethylene, high-density polyethylene, linear polyethylene (ethylene-α-olefin copolymer), and ultra-high molecular weight polyethylene having a weight-average molecular weight of not less than 1,000,000. Among these, ultra-high molecular weight polyethylene having a weight-average molecular weight of not less than 1,000,000 is still more preferable.

The porous film has a thickness of preferably 4 μm to 40 μm, more preferably 5 μm to 30 μm, and still more preferably 6 μm to 15 μm.

The porous film only needs to have a weight per unit area which weight is determined as appropriate in view of the strength, thickness, weight, and handleability of the separator. Note, however, that the porous film has a weight per unit area of preferably 4 g/m² to 20 g/m², more preferably 4 g/m² to 12 g/m², and still more preferably 5 g/m² to 10 g/m², so as to allow a nonaqueous electrolyte secondary battery, which includes a nonaqueous electrolyte secondary battery separator including the porous film, to have a higher weight energy density and a higher volume energy density.

The porous film has an air permeability of preferably 30 sec/100 mL to 500 sec/100 mL and more preferably 50 sec/100 mL to 300 sec/100 mL, in terms of Gurley values. A porous film having such an air permeability allows for sufficient ion permeability.

The porous film has a porosity of preferably 20% by volume to 80% by volume and more preferably 30% by volume to 75% by volume, so as to (i) retain a larger amount of an electrolyte and (ii) obtain the function of reliably preventing (shutting down) a flow of an excessively large electric current at a lower temperature. The porous film has a pore diameter of preferably not more than 0.3 μm and more preferably not more than 0.14 μm, so as to (i) obtain sufficient ion permeability and (ii) prevent particles from entering the positive electrode or the negative electrode.

The porous film has a white index (WI) (hereinafter also referred to simply as "WI") value of preferably 85 to 98, more preferably not less than 90, and still more preferably not more than 97. The white index (WI) is defined in the American Standard Test Methods (hereinafter abbreviated as "ASTM") E313.

The WI is an indicator of a color tone (whiteness) of a sample, and is used to indicate, for example, (i) the fading characteristic of a dye and (ii) the degree of oxidation degradation in transparent or white resin being processed. A higher WI value means a higher degree of whiteness. In contrast, a lower WI value means a lower degree of whiteness. Further, a lower WI value presumably means a larger amount of functional groups, such as a carboxy group, at a surface of the porous film which surface is in contact with air (oxygen) (e.g., a surface of each pore of the porous film). Such functional groups prevent permeation of Li ions. This leads to a decrease in Li ion permeability. In a case where a porous film has a high WI value, wavelength dependency of reflection and scattering is low in the porous film.

The porous film can be produced by, for example, (1) a method of obtaining a porous film by adding a filler (pore forming agent) to a resin such as polyolefin, shaping the resin into a sheet, then removing the filler with use of an appropriate solvent, and stretching the sheet from which the filler has been removed, or (2) a method of obtaining a porous film by adding a filler to a resin such as polyolefin, shaping the resin into a sheet, then stretching the sheet, and removing the filler from the sheet thus stretched. This means that a resultant porous film ordinarily does not contain a filler.

The inventor of the present invention has found that a porous film can have a WI value of 85 to 98 in a case where (i) generation of a functional group such as a carboxyl group is prevented by using, during production of the porous film, a filler having a large BET specific surface area to allow for an increase in dispersibility of the filler and to consequently prevent local oxidation degradation caused by defective dispersion of the filler during heat processing and (ii) the porous film is made denser.

The "filler having a large BET specific surface area" refers to a filler having a BET specific surface area of 6 m²/g to 16 m²/g. A filler having a BET specific surface area of less than 6 m²/g is not preferable. This is because such a filler tends to cause large-sized pores to be developed. A filler having a BET specific surface area of more than 16 m²/g causes agglomeration of the filler and therefore leads to defective dispersion of the filler, so that dense pores are less likely to be developed. Therefore, the filler has a BET specific surface area of preferably 8 m²/g to 15 m²/g, and more preferably 10 m²/g to 13 m²/g.

Specific examples of the filler encompass fillers made of inorganic matters such as calcium carbonate, magnesium carbonate, barium carbonate, calcium sulfate, magnesium sulfate, and barium sulfate. It is possible to use (i) only one kind of the above fillers or (ii) two or more kinds of the above fillers in combination. Among the above examples, a filler made of calcium carbonate has a large BET specific surface area, and is therefore particularly preferable.

Whether or not the porous film has a WI value of 85 to 98 can be determined through, for example, measurement of WI values with use of an integrating-sphere spectrocolorimeter. The porous film described above has a front surface and a back surface, both of which satisfy such a requirement that the WI value is 85 to 98.

A porous film having a WI value of 85 to 98 achieves a proper amount of functional groups, such as a carboxy group, at the surface of the porous film which surface is in contact with air (oxygen). This makes it possible to improve the ion permeability of the porous film within a proper range.

A porous film having a WI value of less than 85 results in a large amount of the functional groups. This prevents the ion permeability of the porous film.

A porous film having a WI value of more than 98 results in an excessively small amount of the functional groups at the surface of the porous film, which surface is in contact with air (oxygen). This results in a decrease in the compatibility of the porous film with electrolyte. Therefore, such a porous film is undesirable.

In a case where the porous layer or the another layer is disposed on the porous film, physical property values of the porous film, which is included in the laminated body including the porous film and the porous layer or the another layer, can be measured after the porous layer or the another layer is removed from the laminated body. The porous layer or the another layer can be removed from the laminated body by, for example, a method of dissolving the resin of the porous layer or of the another layer with use of a solvent such as N-methylpyrrolidone or acetone for removal.

(Porous Layer)

In an embodiment of the present invention, the porous layer, as a member included in a nonaqueous electrolyte secondary battery, is provided between (i) a nonaqueous electrolyte secondary battery separator and (ii) at least one of the positive electrode plate and the negative electrode plate. The porous layer can be provided on one surface or both surfaces of the nonaqueous electrolyte secondary battery separator. Alternatively, the porous layer can be disposed on an active material layer of at least one of the positive electrode plate and the negative electrode plate. Alternatively, the porous layer can be provided between the nonaqueous electrolyte secondary battery separator and at least one of the positive electrode plate and the negative electrode plate so as to be in contact with the nonaqueous electrolyte secondary battery separator and with the at least one of the positive electrode plate and the negative electrode plate. The porous layer, which is provided between the nonaqueous electrolyte secondary battery separator and at least one of the positive electrode plate and the negative electrode plate, can be a single layer or can be made up of two or more layers.

The porous layer is preferably an insulating porous layer containing a resin.

The resin, which can be contained in the porous layer, is preferably a resin that is insoluble in the electrolyte of the battery and that is electrochemically stable when the battery is in normal use. In a case where the porous layer is disposed on one surface of the porous film, the porous layer is disposed preferably on a surface of the porous film which surface faces the positive electrode plate of the nonaqueous electrolyte secondary battery, and more preferably on a surface of the porous film which surface is in contact with the positive electrode plate.

The porous layer in accordance with an embodiment of the present invention is characterized by containing a PVDF-based resin, the PVDF-based resin containing a PVDF-based resin having crystal form α (hereinafter referred to as "α-form PVDF-based resin") in an amount of not less than 35.0 mol % with respect to 100 mol % of the total amount of (i) the α-form PVDF-based resin and (ii) a PVDF-based resin having crystal form β (hereinafter referred to as "β-form PVDF-based resin") contained in the PVDF-based resin.

The amount of the α-form PVDF-based resin contained is calculated from (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum.

The porous layer has a structure in which many pores, connected to one another, are provided, so that the porous layer is a layer through which a gas or a liquid can pass from one surface to the other. Further, in a case where the porous layer in accordance with an embodiment of the present invention is used as a member included in a nonaqueous electrolyte secondary battery laminated separator, the porous layer can be a layer which, serving as an outermost layer of the separator, adheres to an electrode.

Examples of the PVDF-based resin encompass: homopolymers of vinylidene fluoride; copolymers of vinylidene fluoride and other monomer(s) copolymerizable with vinylidene fluoride; and mixtures of the above polymers. Examples of the monomer copolymerizable with vinylidene fluoride encompass hexafluoropropylene, tetrafluoroethylene, trifluoroethylene, trichloroethylene, and vinyl fluoride. One kind of these monomers can be used or two or more of kinds of these monomers can be used in combination. The PVDF-based resin can be synthesized through emulsion polymerization or suspension polymerization.

The PVDF-based resin contains vinylidene fluoride at a proportion of ordinarily not less than 85 mol %, preferably not less than 90 mol %, more preferably not less than 95 mol %, still more preferably not less than 98 mol %. A PVDF-based resin containing vinylidene fluoride at a proportion of not less than 85 mol % easily allows a porous layer to have (i) a mechanical strength against pressure applied during battery production and (ii) a resistance to heat applied during battery production.

In a preferable aspect, the porous layer preferably contains two kinds of PVDF-based resins (a first resin and a second resin described below) that are different in terms of, for example, hexafluoropropylene content.

First resin: (i) a vinylidene fluoride-hexafluoropropylene copolymer containing hexafluoropropylene in an amount of more than 0 mol % and not more than 1.5 mol % or (ii) a vinylidene fluoride homopolymer.

Second resin: a vinylidene fluoride-hexafluoropropylene copolymer containing hexafluoropropylene in an amount of more than 1.5 mol %.

A porous layer containing the two kinds of PVDF-based resins has improved adhesiveness to an electrode in comparison with a porous layer lacking either one of the two kinds of PVDF-based resins. Furthermore, in comparison with a porous layer lacking either one of the two kinds of PVDF-based resin, a porous layer containing the two kinds of PVDF-based resins has improved adhesiveness to another layer (for example, the porous film layer) included in a nonaqueous electrolyte secondary battery separator. This leads to an increase in peel force between the two layers. The first resin and the second resin are preferably mixed at a mass ratio of 15:85 to 85:15.

The PVDF-based resin has a weight-average molecular weight of preferably 200,000 to 3,000,000, more preferably 200,000 to 2,000,000, and still more preferably 500,000 to 1,500,000. A PVDF-based resin having a weight-average molecular weight of not less than 200,000 tends to allow the porous layer to sufficiently adhere to an electrode. Meanwhile, a PVDF-based resin having a weight-average molecular weight of not more than 3,000,000 tends to allow the porous layer to have excellent formability.

The porous layer in accordance with an embodiment of the present invention can contain a resin other than the PVDF-based resin. Examples of the resin encompass: a styrene-butadiene copolymer; homopolymers or copolymers of vinyl nitriles such as acrylonitrile and methacrylonitrile; and polyethers such as polyethylene oxide and polypropylene oxide.

The porous layer in accordance with an embodiment of the present invention can contain a filler such as an inorganic filler (e.g., fine metal oxide particles) or an organic filler. The filler is contained at a proportion of preferably 1% by mass to 99% by mass and more preferably 10% by mass to 98% by mass, with respect to the total amount of the PVDF-based resin and the filler. A lower limit value of the proportion of the filler can be not less than 50% by mass, not less than 70% by mass, or not less than 90% by mass. The filler, such as an organic filler or an inorganic filler, can be a conventionally known filler.

The porous layer in accordance with an embodiment of the present invention has an average thickness of preferably 0.5 µm to 10 µm (per layer), and more preferably 1 µm to 5 µm (per layer), in order to secure (i) adhesiveness of the porous layer to an electrode and (ii) a high energy density.

A porous layer having a thickness of not less than 0.5 µm (per layer) makes it possible to (i) sufficiently prevent an internal short circuit from occurring due to, for example, breakage of a nonaqueous electrolyte secondary battery and (ii) allow an amount of electrolyte retained in the porous layer to be sufficient.

Meanwhile, if the thickness of the porous layer (per layer) is more than 10 µm, then a nonaqueous electrolyte secondary battery will have an increased resistance to permeation of lithium ions. Therefore, repeating charge and discharge cycles causes the positive electrode of the nonaqueous electrolyte secondary battery to deteriorate. This causes a rate characteristic and a cycle characteristic to deteriorate. In addition, such a porous layer leads to an increased distance between the positive electrode and the negative electrode, and therefore results in a decreased volume efficiency in the nonaqueous electrolyte secondary battery.

The porous layer in accordance with the present embodiment is preferably provided between (i) the nonaqueous electrolyte secondary battery separator and (ii) a positive electrode active material layer included in the positive electrode plate. Physical properties of the porous layer, which are described below, at least refer to physical properties of the porous layer which is provided between (i) a nonaqueous electrolyte secondary battery separator of a nonaqueous electrolyte secondary battery and (ii) a positive electrode active material layer included in a positive electrode plate of the nonaqueous electrolyte secondary battery.

The porous layer has a weight per unit area (per layer) which can be set as appropriate, in view of strength, a thickness, a weight, and handleability of the porous layer. A coating amount (weight per unit area) of the porous layer is preferably 0.5 g/m$^2$ to 20 g/m$^2$ (per layer) and more preferably 0.5 g/m$^2$ to 10 g/m$^2$ (per layer).

The porous layer, which has a weight per unit area which weight falls within the above numerical ranges, allows a nonaqueous electrolyte secondary battery including the porous layer to have a higher weight energy density and a higher volume energy density. If the weight per unit area of the porous layer is beyond the above ranges, then the nonaqueous electrolyte secondary battery will be heavy.

The porous layer has a porosity of preferably 20% by volume to 90% by volume and more preferably 30% by volume to 80% by volume, in order to achieve sufficient ion permeability. The pore diameter of the pores of the porous layer is preferably not more than 1.0 µm, more preferably not more than 0.5 µm. The porous layer having pores which are set to have a pore diameter falling within these ranges achieves sufficient ion permeability.

The porous layer in accordance with an embodiment of the present invention has a surface roughness, in terms of a ten-point average roughness (Rz), of preferably 0.8 µm to 8.0 µm, more preferably 0.9 µm to 6.0 µm, and still more preferably 1.0 µm to 3.0 µm. A ten-point average roughness (Rz) is a value measured by a method in conformity with JIS B 0601-1994 (or Rzjis of JIS B 0601-2001). Specifically, Rz is a value measured with use of ET4000 (manufactured by Kosaka Laboratory Ltd.) with a measurement length of 1.25 mm, a measurement rate of 0.1 mm/sec, and a temperature and humidity of 25° C./50% RH.

The porous layer in accordance with an embodiment of the present invention has a coefficient of kinetic friction of preferably 0.1 to 0.6, more preferably 0.1 to 0.4, and still more preferably 0.1 to 0.3. A coefficient of kinetic friction is a value measured by a method in conformity with JIS K 7125. Specifically, a coefficient of kinetic friction in accordance with an embodiment of the present invention is a value measured with use of Surface Property Tester (manufactured by Heidon).

As described above, the nonaqueous electrolyte secondary battery laminated separator in accordance with an embodiment of the present invention contains a porous film which can exhibit a certain WI, that is, excellent ion permeability.

The nonaqueous electrolyte secondary battery laminated separator has an air permeability of preferably 30 sec/100 mL to 1000 sec/100 mL and more preferably 50 sec/100 mL to 800 sec/100 mL, in terms of Gurley values. A nonaqueous electrolyte secondary battery laminated separator having an air permeability falling within the above ranges allows a nonaqueous electrolyte secondary battery, which includes the nonaqueous electrolyte secondary battery laminated separator, to have sufficient ion permeability.

A nonaqueous electrolyte secondary battery laminated separator, which has an air permeability lower than the above ranges means that the nonaqueous electrolyte secondary battery laminated separator has a coarse laminated structure due to a high porosity thereof. This causes the nonaqueous electrolyte secondary battery laminated separator to have a lower strength, so that the nonaqueous electrolyte secondary battery laminated separator may be insufficient in shape stability, particularly shape stability at a high temperature. Meanwhile, if the air permeability is beyond the above ranges, then a nonaqueous electrolyte secondary battery laminated separator may not have sufficient ion permeability. This may lead to deterioration of a battery characteristic of a nonaqueous electrolyte secondary battery.

(Crystal Forms of PVDF-Based Resin)

The PVDF-based resin contained in the porous layer used in an embodiment of the present invention contains an α-form PVDF-based resin in an amount of not less than 35.0 mol %, preferably not less than 37.0 mol %, more preferably not less than 40.0 mol %, and still more preferably not less than 44.0 mol %, with respect to 100 mol % of the total amount of the α-form PVDF-based resin and the β-form PVDF-based resin contained. Further, the amount of α-form PVDF-based resin is preferably not more than 90.0 mol %. A porous layer containing the α-form PVDF-based resin in an amount falling within the above ranges is suitably used as a constituent member of a nonaqueous electrolyte secondary battery having an excellent characteristic of maintaining a charge capacity after high-rate discharge, particularly as a constituent member of a laminated separator for such a nonaqueous electrolyte secondary battery or as a constituent member of an electrode for such a nonaqueous electrolyte secondary battery.

The nonaqueous electrolyte secondary battery generates heat during charge/discharge due to internal resistance. A larger current, that is, a high-rate condition, results in generation of a larger amount of heat. An α-form PVDF-based resin has a melting point higher than that of a β-form PVDF-based resin. This causes the α-form PVDF-based resin to be less likely to undergo plastic deformation due to heat than the β-form PVDF-based resin. It is known that a β-form PVDF-based resin is more polarizable than an α-form PVDF-based resin because a β-form PVDF-based resin has a structure in which F atoms are arranged in one side of the structure.

According to the porous layer in accordance with an embodiment of the present invention, controlling a proportion of the α-form PVDF-based resin of the PVDF-based resin contained in the porous layer to be equal to or more than a certain value makes the following possible: (i) to decrease, for example, deformation of an internal structure of the porous layer and blockage of voids, the deformation and the blockage occurring due to deformation of the PVDF-based resin as a result of heat generated during charge/discharge, particularly during operation under high-rate conditions and (ii) to prevent uneven distribution of Li ions, which uneven distribution occurs due to interaction between the Li ions and the PVDF-based resin. This consequently prevents a battery from deteriorating in performance.

The α-form PVDF-based resin is arranged such that the polymer of the PVDF-based resin contains a PVDF skeleton having molecular chains including a main-chain carbon atom bonded to a fluorine atom (or a hydrogen atom) which is adjacent to two carbon atoms, one of which is bonded to a hydrogen atom (or a fluorine atom) having a trans position and the other (opposite) one of which is bonded to a hydrogen atom (or a fluorine atom) having a gauche position (positioned at an angle of 60°), such that two or more such conformations are chained consecutively as follows:

$$(T\ G\ T\ \overline{G}\ \text{Structure}) \quad [\text{Math. 1}]$$

and the molecular chains each have the following type:

$$T\ G\ T\ \overline{G} \quad [\text{Math. 2}]$$

such that the respective dipole moments of $C-F_2$ and $C-H_2$ bonds each have a component perpendicular to the molecular chain and a component parallel to the molecular chain.

In a $^{19}$F-NMR spectrum of the α-form PVDF-based resin, characteristic peaks appear at around −95 ppm and at around −78 ppm.

The β-form PVDF-based resin is arranged such that the polymer of the PVDF-based resin contains a PVDF skeleton having molecular chains including a main-chain carbon atom adjacent to two carbon atoms bonded to a fluorine atom and a hydrogen atom, respectively, each having a trans conformation (TT-type conformation), that is, the fluorine atom and the hydrogen atom bonded respectively to the two carbon atoms are positioned oppositely at an angle of 180° to the direction of the carbon-carbon bond.

The β-form PVDF-based resin can be arranged such that the polymer of the PVDF-based resin contains a PVDF skeleton that has a TT-type conformation in its entirety. The β-form PVDF-based resin can alternatively be arranged such that a portion of the PVDF skeleton has a TT-type conformation and that the β-form PVDF-based resin has a molecular chain of the TT-type conformation in at least four consecutive PVDF monomeric units. In either case, (i) the carbon-carbon bond, in which the TT-type conformation constitutes a TT-type main chain, has a planar zigzag structure, and (ii) the respective dipole moments of $C-F_2$ and $C-H_2$ bonds each have a component perpendicular to the molecular chain.

In a $^{19}$F-NMR spectrum of the β-form PVDF-based resin, a characteristic peak appears at around −95 ppm.

(Method of Calculating α-Form PVDF-Based Resin Content Rate and β-Form PVDF-Based Resin Content Rate)

An α-form PVDF-based resin content rate and a β-form PVDF-based resin content rate of a porous layer in accordance with an embodiment of the present invention, with respect to 100 mol % of the total amount of the α-form PVDF-based resin and the β-form PVDF-based resin contained, can be calculated from $^{19}$F-NMR spectrum obtained from the porous layer. Specifically, the following calculation method, for example, can be employed.

(1) An $^{19}$F-NMR spectrum is measured from a porous layer containing a PVDF-based resin, under the following conditions.

Measurement Conditions

Measurement device: AVANCE400 manufactured by Bruker Biospin

Measurement method: single-pulse method

Observed nucleus: $^{19}$F

Spectral bandwidth: 100 kHz

Pulse width: 3M s (90° pulse)

Pulse repetition time: 5.0 s

Reference material: $C_6F_6$ (external reference: −163.0 ppm)

Temperature: 22° C.

Sample rotation frequency: 25 kHz (2) An integral value of a peak at around −78 ppm in the $^{19}$F-NMR spectrum obtained in (1) is calculated and is regarded as an α/2 amount.

(3) As with the case of (2), an integral value of a peak at around −95 ppm in the $^{19}$F-NMR spectrum obtained in (1) is calculated and is regarded as $\{(\alpha/2)+\beta\}$ amount.

(4) The α-form PVDF-based resin content rate (hereinafter also referred to as "α rate") is calculated from the integral value obtained in (2) and (3) according to the following Formula (1), where the total amount of the α-form PVDF-based resin contained and β-form PVDF-based resin contained is 100 mol %:

$$\alpha\ \text{rate (mol \%)} = [(\text{integral value at around } -78\ \text{ppm}) \times 2 / \{(\text{integral value at around } -95\ \text{ppm}) + (\text{integral value at around } -78\ \text{ppm})\}] \times 100 \quad (1)$$

(5) The β-form PVDF-based resin content rate (hereinafter also referred to as "β rate") is calculated from the α rate obtained in (4) according to the following Formula (2), where the total amount of the α-form PVDF-based resin and β-form PVDF-based resin contained is 100 mol %:

$$\beta\ \text{rate (mol \%)} = 100\ (\text{mol \%}) - \alpha\ \text{rate (mol \%)} \quad (2)$$

(Porous Layer Production Method, Nonaqueous Electrolyte Secondary Battery Laminated Separator Production Method)

The porous layer in accordance with an embodiment of the present invention and the nonaqueous electrolyte secondary battery laminated separator in accordance with an embodiment of the present invention can be produced by any of various methods.

For example, a porous layer containing a PVDF-based resin and optionally a filler is formed, through one of processes (1) through (3) described below, on a surface of a porous film which is to serve as a base material. In a case where the process (2) or (3) is carried out, the porous layer can be produced by further drying a deposited porous layer so as to remove a solvent. In a case where a coating solution in any of the processes (1) through (3) is used for production of a porous layer containing a filler, the coating solution is preferably configured so that (i) the filler is dispersed in the coating solution and (ii) a PVDF-based resin is dissolved in the coating solution.

The coating solution for use in a method of producing the porous layer in accordance with an embodiment of the present invention can be prepared ordinarily by (i) dissolving, in a solvent, a resin to be contained in the porous layer and (ii) dispersing, in the solvent, the fine particles contained in the porous layer.

(1) A process in which (i) a surface of a porous film is coated with a coating solution containing (a) fine particles of a PVDF-based resin to form a porous layer and optionally (b) fine particles of a filler and (ii) the surface of the porous film is dried to remove the solvent (dispersion medium) from the coating solution, so that the porous layer is formed.

(2) A process in which (i) a surface of a porous film is coated with the coating solution described in (1) and then (i the resultant porous film is immersed in a deposition solvent (which is a poor solvent for the PVDF-based resin), so that a porous layer is deposited.

(3) A process in which (i) a surface of a porous film is coated with a coating solution described in (1) and then (ii) the coating solution is made acidic with use of a low-boiling-point organic acid, so that a porous layer is deposited.

Examples of the solvent (dispersion medium) in the coating solution encompass N-methylpyrrolidone, N,N-dimethylacetamide, N,N-dimethylformamide, acetone, and water.

Preferable examples of the deposition solvent encompass isopropyl alcohol and t-butyl alcohol.

For the process (3), the low-boiling-point organic acid can be, for example, paratoluene sulfonic acid or acetic acid.

As appropriate, the coating solution can contain, as a component different from the resin and the fine particles, additive(s) such as a dispersing agent, a plasticizer, a surfactant, and/or a pH adjuster.

Examples of the base material other than the porous film encompass another film, a positive electrode plate, and a negative electrode plate.

The base material can be coated with coating solution by a conventionally publicly known method. Specific examples of such a method encompass a gravure coater method, a dip coater method, a bar coater method, and a die coater method.

(Method of Controlling Crystal Form of PVDF-Based Resin)

The crystal form of a PVDF-based resin contained in the porous layer in accordance with an embodiment of the present invention can be controlled with (i) drying conditions in the above-described method, such as (a) a drying temperature and (b) air velocity and air direction during drying and (ii) a deposition temperature in a case where a porous layer containing a PVDF-based resin is deposited with use of a deposition solvent or a low-boiling-point organic acid.

In a case where the coating solution is simply dried as in the process (1), the drying conditions can be changed as appropriate by adjusting, for example, the amount of the solvent in the coating solution, the PVDF-based resin concentration in the coating solution, the amount of the filler (if contained), and/or the coating amount of the coating solution. In a case where a porous layer is to be formed through the process (1), it is preferable that (i) the drying temperature is 30° C. to 100° C., (ii) the direction of hot air for drying is perpendicular to a porous base material or electrode sheet which has been coated with the coating solution, and (iii) the velocity of the hot air is 0.1 m/s to 40 m/s. Specifically, in a case where a coating solution to be applied contains N-methyl-2-pyrrolidone as the solvent for dissolving a PVDF-based resin, 1.0% by mass of a PVDF-based resin, and 9.0% by mass of alumina as an inorganic filler, the drying conditions are preferably adjusted so that (i) the drying temperature is 40° C. to 100° C., (ii) the direction of hot air for drying is perpendicular to a porous base material or electrode sheet which has been coated with the coating solution, and (iii) the velocity of the hot air is 0.4 m/s to 40 m/s.

In a case where a porous layer is to be formed through the process (2), the deposition temperature is preferably −25° C. to 60° C., and the drying temperature is preferably 20° C. to 100° C. Specifically, in a case where a porous layer is to be formed through the process (2) with use of N-methylpyrrolidone as the solvent for dissolving a PVDF-based resin and isopropyl alcohol as the deposition solvent, it is preferable that (i) the deposition temperature is −10° C. to 40° C. and (ii) the drying temperature is 30° C. to 80° C.

(Another Porous Layer)

The nonaqueous electrolyte secondary battery in accordance with an embodiment of the present invention can contain another porous layer in addition to (i) the porous film and (ii) the porous layer containing the PVDF-based resin. The another porous layer need only be provided between (i) the nonaqueous electrolyte secondary battery separator and (ii) at least one of the positive electrode plate and the negative electrode plate. The porous layer and the another porous layer may be provided in any order with respect to the nonaqueous electrolyte secondary battery separator. In a preferable configuration, the porous film, the another porous layer, and the porous layer containing the PVDF-based resin are disposed in this order. In other words, the another porous layer is provided between the porous film and the porous layer containing the PVDF-based resin. In another preferable configuration, the another porous layer and the porous layer containing the PVDF-based resin are provided in this order on both surfaces of the porous film.

Examples of a resin which can be contained in the another porous layer in accordance with an embodiment of the present invention encompass: polyolefins; (meth)acrylate-based resins; fluorine-containing resins (excluding polyvinylidene fluoride-based resins); polyamide-based resins; polyimide-based resins; polyester-based resins; rubbers; resins with a melting point or glass transition temperature of not lower than 180° C.; water-soluble polymers; polycarbonate, polyacetal, and polyether ether ketone.

Among the above resins, polyolefins, (meth)acrylate-based resins, polyamide-based resins, polyester-based resins, and water-soluble polymers are preferable.

Preferable examples of the polyolefin encompass polyethylene, polypropylene, polybutene, and an ethylene-propylene copolymer.

Examples of the fluorine-containing resins encompass polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer. Particular examples of the fluorine-containing resins encompass fluorine-containing rubber having a glass transition temperature of not higher than 23° C.

Preferable examples of the polyamide-based resin encompass aramid resins such as aromatic polyamide and wholly aromatic polyamide.

Specific examples of the aramid resin encompass poly(paraphenylene terephthalamide), poly(metaphenylene isophthalamide), poly(parabenzamide), poly(metabenzamide), poly(4,4'-benzanilide terephthalamide), poly(paraphenylene-4,4'-biphenylene dicarboxylic acid amide), poly(metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/2,6-dichloroparaphenylene terephthalamide copolymer, and a metaphenylene terephthalamide/2,6-dichloroparaphenylene terephthalamide copolymer. Among these aramid resins, poly(paraphenylene terephthalamide) is more preferable.

Preferable examples of the polyester-based resin encompass (i) aromatic polyesters such as polyarylate and (ii) liquid crystal polyesters.

Examples of the rubbers encompass a styrene-butadiene copolymer and a hydride thereof, a methacrylic acid ester copolymer, an acrylonitrile-acrylic acid ester copolymer, a styrene-acrylic acid ester copolymer, an ethylene propylene rubber, and polyvinyl acetate.

Examples of the resin with a melting point or a glass transition temperature of not lower than 180° C. encompass polyphenylene ether, polysulfone, polyether sulfone, polyphenylene sulfide, polyetherimide, polyamide imide, and polyether amide.

Examples of the water-soluble polymer encompass polyvinyl alcohol, polyethylene glycol, cellulose ether, sodium alginate, polyacrylic acid, polyacrylamide, and polymethacrylic acid.

Only one kind of these resins to be contained in the another porous layer can be used, or two or more kinds of these resins can be used in combination.

The other characteristics (e.g., thickness) of the another porous layer are similar to those (of the porous layer) described above, except that the porous layer contains the PVDF-based resin.

<Positive Electrode Plate>

The positive electrode plate included in the nonaqueous electrolyte secondary battery in accordance with an embodiment of the present invention is not limited to any particular one, provided that the positive electrode plate has a capacitance falling within the above-described ranges per measurement area of 900 mm$^2$. For example, a sheet-shaped positive electrode plate used in the nonaqueous electrolyte secondary battery includes (i) a positive electrode mix as a positive electrode active material layer, which positive electrode mix contains a positive electrode active material, an electrically conductive agent, and a binding agent and (ii) a positive electrode current collector supporting the positive electrode mix thereon. Note that the positive electrode plate can be arranged such that the positive electrode current collector supports positive electrode mixes on respective both surfaces of the positive electrode current collector or can be alternatively arranged such that the positive electrode current collector supports the positive electrode mix on one surface of the positive electrode current collector.

The positive electrode active material is, for example, a material capable of being doped with and dedoped of lithium ions. Specific examples of the material encompass lithium complex oxides each containing at least one transition metal such as V, Mn, Fe, Co, or Ni.

Examples of the electrically conductive agent encompass carbonaceous materials such as natural graphite, artificial graphite, cokes, carbon black, pyrolytic carbons, carbon fiber, and a fired product of an organic polymer compound. It is possible to use (i) only one kind of the above electrically conductive agents or (ii) two or more kinds of the above electrically conductive agents in combination.

Examples of the binding agent include: thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoropropylene copolymer, a vinylidene fluoride-hexafluoropropylene-tetrafluoroethylene copolymer, a thermoplastic polyimide, polyethylene, and polypropylene; an acrylic resin; and styrene butadiene rubber. Note that the binding agent serves also as a thickener.

Examples of the positive electrode current collector encompass electric conductors such as Al, Ni, and stainless steel. Among these, Al is preferable because Al is easily processed into a thin film and is inexpensive.

Examples of a method of producing the sheet-shaped positive electrode plate encompass: a method in which a positive electrode active material, an electrically conductive agent, and a binding agent are pressure-molded on a positive electrode current collector; and a method in which (i) a positive electrode active agent, an electrically conductive agent, and a binding agent are formed into a paste with the use of a suitable organic solvent, (ii) a positive electrode current collector is coated with the paste, and then (iii) the paste is dried and then pressured so that the paste is firmly fixed to the positive electrode current collector.

<Negative Electrode Plate>

The negative electrode plate included in the nonaqueous electrolyte secondary battery in accordance with an embodiment of the present invention is not limited to any particular one, provided that the negative electrode plate has a capacitance falling within the above-described ranges per measurement area of 900 mm$^2$. For example, a sheet-shaped negative electrode plate used in the nonaqueous electrolyte secondary battery includes (i) a negative electrode mix as a negative electrode active material layer, which negative electrode mix contains a negative electrode active material and (ii) a negative electrode current collector supporting the negative electrode mix thereon. The sheet-shaped negative electrode plate preferably contains an electrically conductive agent as described above and a binding agent as described above. Note that the negative electrode plate can be arranged such that the negative electrode current collector supports negative electrode mixes on respective both surfaces of the negative electrode current collector or can be alternatively arranged such that the negative electrode current collector supports the negative electrode mix on one surface of the negative electrode current collector.

Examples of the negative electrode active material encompass (i) a material capable of being doped with and dedoped of lithium ions, (ii) a lithium metal, and (iii) a lithium alloy. Examples of the material encompass a carbonaceous material. Examples of the carbonaceous material encompass natural graphite, artificial graphite, cokes, carbon black, and pyrolytic carbons. The electrically conductive agent can be any of the conductive agents described as those which can be contained in the positive electrode active material layer. The binding agent can be any of the binding agents described as those which can be contained in the positive electrode active material layer.

The negative electrode current collector is, for example, Cu, Ni, or stainless steel. Among these, Cu is preferable because it is not easily alloyed with lithium in the case of a lithium-ion secondary battery in particular and is easily processed into a thin film.

Examples of a method of producing the sheet-shaped negative electrode plate encompass: a method in which a negative electrode active material is pressure-molded on a negative electrode current collector; and a method in which (i) a negative electrode active material is formed into a paste with the use of a suitable organic solvent, (ii) a negative electrode current collector is coated with the paste, and then (iii) the paste is dried and then pressured so that the paste is firmly fixed to the negative electrode current collector. The paste preferably contains an electrically conductive agent as described above and a binding agent as described above.

<Nonaqueous Electrolyte>

A nonaqueous electrolyte, which can be contained in the nonaqueous electrolyte secondary battery in accordance with an embodiment of the present invention, is not limited to any particular one, provided that the nonaqueous electrolyte is that which is generally used in a nonaqueous electrolyte secondary battery. Examples of the nonaqueous electrolyte encompass a nonaqueous electrolyte prepared by dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use (i) only one kind of the above lithium salts or (ii) two or more kinds of the above lithium salts in combination.

Examples of the organic solvent contained in the nonaqueous electrolyte encompass carbonates, ethers, esters, nitriles, amides, carbamates, sulfur-containing compounds, and fluorine-containing organic solvents obtained by introducing a fluorine group into any of these organic solvents. It is possible to use (i) only one kind of the above organic solvents or two or (ii) more kinds of the above organic solvents in combination.

<Method of Producing Nonaqueous Electrolyte Secondary Battery>

The nonaqueous electrolyte secondary battery in accordance with an embodiment of the present invention can be produced by, for example, (i) forming the nonaqueous electrolyte secondary battery member by disposing the positive electrode plate, the nonaqueous electrolyte secondary battery separator, and the negative electrode plate in this order, (ii) placing the nonaqueous electrolyte secondary battery member in a container which is to serve as a housing of the nonaqueous electrolyte secondary battery, (iii) filling the container with the nonaqueous electrolyte, and then (iv) hermetically sealing the container while reducing pressure inside the container.

As described above, the nonaqueous electrolyte secondary battery in accordance with an embodiment of the present invention includes (i) the nonaqueous electrolyte secondary battery separator containing a polyolefin porous film, (ii) the porous layer, (iii) the positive electrode plate, and (iv) the negative electrode plate. In particular, the nonaqueous electrolyte secondary battery in accordance with an embodiment of the present invention satisfies the following requirements (i) through (iii):

(i) The polyvinylidene fluoride-based resin contained in the porous layer contains an α-form polyvinylidene fluoride-based resin in an amount of not less than 35.0 mol % with respect to 100 mol % of the total amount of (a) the α-form polyvinylidene fluoride-based resin and (b) a β-form polyvinylidene fluoride-based resin contained in the polyvinylidene fluoride-based resin.

(ii) The positive electrode plate has a capacitance of 1 nF to 1000 nF per measurement area of 900 $mm^2$.

(iii) The negative electrode plate has a capacitance of 4 nF to 8500 nF per measurement area of 900 $mm^2$.

Furthermore, the nonaqueous electrolyte secondary battery in accordance with an embodiment of the present invention preferably satisfies the following requirement (iv) in addition to the requirements (i) through (iv) above:

(iv) The polyolefin porous film has a value of white index (WI) of 85 to 98, which white index (WI) is defined in American Standard Test Methods E313.

In a case where the requirement (i) is satisfied, the porous layer of the nonaqueous electrolyte secondary battery in accordance with an embodiment of the present invention has good structural stability after charge and discharge under high-rate conditions. Furthermore, in a case where the requirement (iv) is satisfied, the permeability of the polyolefin porous film (separator) to cations is promoted. In a case where the requirements (ii) and (iii) are satisfied, the positive electrode active material layer of the positive electrode plate and the negative electrode active material layer of the negative electrode plate are each in a suitable polarization state. This promotes (a) salvation of cations with an electrolyte solvent, in the negative electrode plate and at a surface of the negative electrode plate and (b) desolvation of cations from the electrolyte solvent, in the positive electrode plate and at a surface of the positive electrode plate. This leads to an improvement in permeability of cations.

Therefore, a nonaqueous electrolyte secondary battery which satisfies the requirements (i) through (iii) brings about the following advantages (a) and (b): (a) a porous layer has good structural stability after charge and discharge under high-rate conditions and (b) a positive electrode active material layer of a positive electrode plate and a negative electrode active material layer of a negative electrode plate are each in a suitable polarization state. This leads to a smooth transition, during high-rate discharge, from solvation of cations with an electrolyte solvent to desolvation of the cations from the electrolyte solvent. As a result, a non-uniform distribution of capacitance in a surface direction of an electrode plate due to high-rate discharge is restricted. This solves the problem of non-uniform concentration of the cations. Therefore, during recharging, a non-uniform distribution of capacitance in the surface direction of the electrode plate is corrected, so that it becomes possible to cause the capacitance to be re-distributed uniformly. This presumably allows the nonaqueous electrolyte secondary battery in accordance with an embodiment of the present invention to have an improved charge capacity at 1-C charge after high-rate discharge (10-C discharge).

Furthermore, a nonaqueous electrolyte secondary battery satisfying the requirement (iv) brings about the following advantage (c) in addition to the above advantageous (a) and (b):(c) cation permeability of the polyolefin porous film improves. This presumably further prevents a non-uniform distribution of capacitance in a surface direction of an electrode plate (which non-uniform distribution is caused by a high-rate discharge), and therefore further improves a charge capacity at 1-C charge after high-rate discharge (10-C discharge).

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

The following description will discuss embodiments of the present invention in more detail by Examples and Comparative Examples. Note, however, that the present invention is not limited to these Examples and Comparative Examples.

[Measurement Method]

Measurement in Examples and Comparative Examples below were performed by the following methods.

(1) Thickness (Unit: μm):

With use of a high-resolution digimatic measuring unit (VL-50) manufactured by Mitutoyo Corporation, the following were measured: (i) the thickness of a porous film, (ii) the thickness of the positive electrode active material layer, and (iii) thickness of the negative electrode active material layer. Note that the thickness of the positive electrode active material layer was calculated by subtracting the thickness of an aluminum foil serving as a current collector from the thickness of the positive electrode plate. Meanwhile, the thickness of the negative electrode active material layer was calculated by subtracting the thickness of copper foil serving as a current collector from the thickness of the negative electrode plate.

(2) White Index (WI):

The WI value of the porous film was measured by a Specular Component Included (SCI) method (including specular reflection) with use of a spectrocolorimeter (CM-2002, manufactured by MINOLTA). During the measurement, the porous film was placed on black paper (manufactured by Hokuetsu Kishu Paper Co., Ltd., colored high-quality paper, black, thickest type, "shirokuhan" (788 mm×1091 mm with the long side extending in a machine direction)).

(3) Method of Calculating α Rate

In each of Examples and Comparative Examples below, a piece having a size of approximately 2 cm×5 cm was cut out from a laminated separator obtained. Then, an α-form PVDF-based resin content rate (α rate) of a PVDF-based resin contained in the laminated separator was measured according to the procedures (1) through (4) described in the previous section ("(Method of calculating α-form PVDF-based resin content rate and β-form PVDF-based resin content rate of PVDF-based resin)").

(4) Measurement of Capacitance of Electrode Plate

In each of Examples and Comparative Examples, capacitances of the obtained positive electrode plate and of the obtained negative electrode plate per measurement area of 900 mm² were each measured with use of an LCR meter (model number: IM3536) manufactured by Hioki E.E. Corporation. Measurement was performed at a frequency of 300 KHz while measurement conditions were set as follows: CV: 0.010 V, SPEED: SLOW2, AVG: 8, CABLE: 1 m, OPEN: All, SHORT: All DCBIAS 0.00 V. Respective absolute values of the capacitances thus measured were used as capacitances in each of Examples and Comparative Examples.

From an electrode plate which was a measurement target, a single piece was cut out so that the single piece had (i) a first portion which had a 3 cm×3 cm square shape and on which an electrode mix was disposed and (ii) a second portion which had a 1 cm×1 cm square shape and on which no electrode mix was disposed. To the second portion of the single piece thus cut out from the electrode plate, a lead wire having a length of 6 cm and a width of 0.5 cm was ultrasonically welded. This produced an electrode plate whose capacitance was to be measured (FIG. 1). An aluminum lead wire was used for the positive electrode plate, and a nickel lead wire was used for the negative electrode plate.

Figure 2:
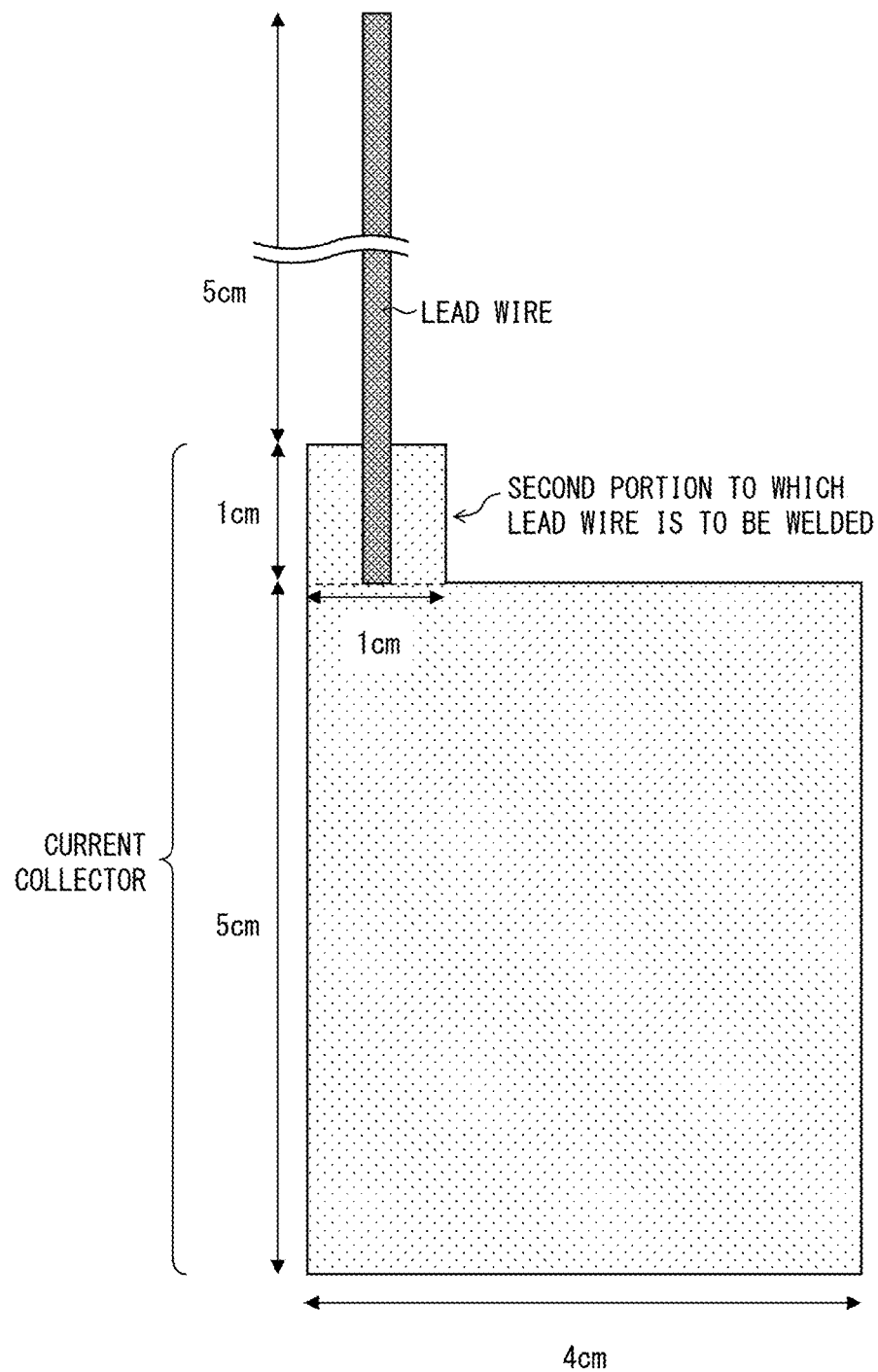
FIG. 2 is a view schematically illustrating a probe electrode which was used for measurement of the capacitance in Examples of the present application.

From a current collector, a single piece was cut out so that the single piece had (i) a first portion which had a 5 cm×4 cm rectangular shape and (ii) a second portion which had a 1 cm×1 cm square shape and to which a lead wire was to be welded. To the second portion of the single piece thus cut out from the current collector, a lead wire having a length of 6 cm and a width of 0.5 cm was ultrasonically welded. This produced a probe electrode (measurement electrode) (FIG. 2). An aluminum probe electrode having a thickness of 20 μm was used to measure the capacitance of the positive electrode plate, and a copper probe electrode having a thickness of 20 μm was used to measure the capacitance of the negative electrode plate.

The probe electrode was laid over the first portion (portion having a 3 cm×3 cm square shape) of the electrode plate, whose capacitance was to be measured. This produced a laminated body. The laminated body thus obtained was sandwiched between two sheets of silicon rubber. A resultant laminated body was further sandwiched between two SUS plates with a pressure of 0.7 MPa. This produced a laminated body which was to be subjected to the measurement. The lead wire of the electrode plate, whose capacitance was to be measured, and the lead wire of the probe electrode were drawn out of the laminated body which was to be subjected to the measurement. A voltage terminal and an electric current terminal of the LCR meter were each connected to those lead wires so that the voltage terminal was closer to the electrode plate than was the electric current terminal.

(5) Measurement of Porosity of Positive Electrode Active Material Layer

A porosity of a positive electrode active material layer included in a positive electrode plate in Example 1 below was measured by a method below. Porosities of positive electrode active material layers included in the positive electrode plates of the other Examples below were likewise measured.

A piece having a size of 14.5 cm² (4.5 cm×3 cm+1 cm×1 cm) was cut out from the positive electrode plate arranged such that a positive electrode mix (a mixture of $LiNi_{0.5}Mn_{0.3}Co_{0.2}O_2$, an electrically conductive agent, and PVDF (at a weight ratio of 92:5:3)) was disposed on one surface of a positive electrode current collector (aluminum foil). The piece of the positive electrode plate had a mass of 0.215 g and a thickness of 58 μm. A piece having the same size as the piece of the positive electrode plate was cut out from the positive electrode current collector. The piece of the positive electrode current collector thus out had a mass of 0.078 g and a thickness of 20 μm.

A density ρ of such a positive electrode active material layer was calculated as $(0.215-0.078)/\{(58-20)/10000 \times 14.5\} = 2.5$ g/cm³.

Materials contained in the positive electrode mix had real densities as follows: the $LiNi_{0.5}Mn_{0.3}Co_{0.2}O_2$, the electrically conductive agent, and the PVDF had real densities of 4.68 g/cm³, 1.8 g/cm³, and 1.8 g/cm³, respectively.

The positive electrode active material layer had a porosity c of 40%, which was calculated with use of the above values according to the following formula:

$$\varepsilon = [1 - \{2.5 \times (92/100)/4.68 \pm 2.5 \times (5/100)/1.8 + 2.5 \times (3/100)/1.8\}] \times 100 = 40\%$$ (Formula).

(6) Measurement of Porosity of Negative Electrode Active Material Layer

A porosity of a negative electrode active material layer included in a negative electrode plate in Example 1 below was measured by a method below. Porosities of negative electrode active material layers included in the negative electrode plates of the other Examples below were likewise measured.

A piece having a size of 18.5 cm² (5 cm×3.5 cm+1 cm×1 cm) was cut out from a negative electrode plate arranged such that a negative electrode mix (a mixture of graphite, a styrene-1,3-butadiene copolymer, and sodium carboxymethyl cellulose (at a weight ratio of 98:1:1)) was disposed on one surface of a negative electrode current collector (copper foil). The piece thus cut out from the negative electrode plate had a mass of 0.266 g and a thickness of 48 µm. A piece having the same size as the piece of the negative electrode plate was cut out from the negative electrode current collector. The piece of the negative electrode current collector had a mass of 0.162 g and a thickness of 10 µm.

A density ρ of such a negative electrode active material layer was calculated as (0.266−0.162)/{(48−10)/10000× 18.5}=1.49 g/cm³.

Materials contained in the negative electrode mix had real densities as follows: the graphite, the styrene-1,3-butadiene copolymer, and the sodium carboxymethyl cellulose had real densities of 2.2 g/cm³, 1 g/cm³, and 1.6 g/cm³, respectively.

The negative electrode active material layer had a porosity ε of 31%, which was calculated with use of the above values according to the following formula:

$$\varepsilon = [1 - \{1.49 \times (98/100)/2.2 + 1.49 \times (1/100)/1 + 1.49 \times (1/100)/1.6\}] \times 100 = 31\% \quad \text{(Formula)}.$$

(7) Battery Characteristic of Nonaqueous Electrolyte Secondary Battery

By a method including the following steps (A) and (B), a nonaqueous electrolyte secondary battery (design capacity: 20.5 mAh) prepared in each of Examples and Comparative Examples was subjected to measurement in terms of a charge capacity characteristic after high-rate discharge.

(A) Initial Charge and Discharge Test

A new nonaqueous electrolyte secondary battery laminated separator, which included a laminated separator produced in each of Examples and Comparative Example and which had not been subjected to any charge-discharge cycle, was subjected to four cycles of initial charge and discharge at 25° C. Each of the four cycles of the initial charge and discharge was carried out (i) at a voltage ranging from 2.7 V to 4.1 V, (ii) with CC-CV charge at a charge current value of 0.2 C (terminal current condition: 0.02 C) and (iii) with CC discharge at a discharge current value of 0.2 C. (Note that 1 C is an electric current value at which a battery rated capacity derived from a one-hour rate discharge capacity was discharged in one hour. This also applies to the following descriptions.) Note that "CC-CV charge" is a charging method in which a battery is charged at a constant electric current which has been set and, after a certain voltage is reached, the certain voltage is maintained while the electric current is being reduced. Note also that "CC discharge" is a discharging method in which a battery is discharged, until a certain voltage is reached, at a constant electric current which has been set. The same applies to the following descriptions.

(B) Charge Capacity Characteristic (mAh) after High-Rate Discharge

The nonaqueous electrolyte secondary battery, which had been subjected to the 4 cycles of initial charge and discharge, was subjected to cycles of charge and discharge under the following conditions: (i) a temperature was set to 55° C.; CO CC-CV charge was carried out at a charge current value of 1 C (terminal current condition: 0.02 C); and (iii) CC discharge was carried out so that the discharge current value was first set to 0.2 C and then changed to 1 C, 5 C, and 10 C in this order every 3 cycles of charge and discharge. In so doing, the voltage ranged from 2.7 V to 4.2 V.

A charge capacity at 1-C charge in the third one of the 3 charge and discharge cycles in which 10-C discharge was carried out was measured, and is shown in Table 1 as a charge capacity (mAh) at the measurement of a high-rate characteristic.

Example 1

[Production of Nonaqueous Electrolyte Secondary Battery Laminated Separator]

Ultra-high molecular weight polyethylene powder (GUR2024, manufactured by Ticona Corporation) having a weight-average molecular weight of 4,970,000 and polyethylene wax (FNP-0115, manufactured by Nippon Seiro Co., Ltd.) having a weight-average molecular weight of 1,000 were mixed so that a resultant mixture would contain the ultra-high molecular weight polyethylene powder in an amount of 68.0% by weight and the polyethylene wax in an amount of 32.0% by weight. The total amount of the ultra-high molecular weight polyethylene powder and the polyethylene wax in the mixture was assumed to be 100 parts by weight. To the 100 parts by weight of the mixture, 0.4 parts by weight of an antioxidant (Irg1010, manufactured by Ciba Specialty Chemicals Inc.), 0.1 parts by weight of an antioxidant (P168, manufactured by Ciba Specialty Chemicals Inc.), and 1.3 parts by weight of sodium stearate were added. Then, calcium carbonate (manufactured by Maruo Calcium Co., Ltd.) having a BET specific surface area of 11.8 m²/g was further added so as to account for 38% by volume of the entire volume of the resultant mixture. Then, while the resultant mixture was in the form of powder, the mixture was mixed in a Henschel mixer. Then, the mixture was melted and kneaded with use of a twin screw kneading extruder. This produced a polyolefin resin composition.

Then, the polyolefin resin composition was rolled with use of a pair of rollers each having a surface temperature of 150° C. This produced a sheet of the polyolefin resin composition. This sheet was immersed in an aqueous hydrochloric acid solution (containing 4 mol/L of hydrochloric acid and 1.0% by weight of a nonionic surfactant) at 43° C., so that the calcium carbonate was removed. The resultant sheet was cleaned with water at 45° C. Subsequently, the sheet thus cleaned was stretched at a stretch ratio of 6.2 times at 100° C. with use of a tenter uniaxial stretching machine manufactured by Ichikin Co., Ltd. This produced a porous film 1. The porous film 1 thus obtained had (i) a thickness of 10.0 µm, (ii) a weight per unit area of 6.4 g/m², and (iii) a white index (WI) of 87.

An N-methyl-2-pyrrolidone (hereinafter referred to also as "NMP") solution (manufactured by Kureha Corporation; product name: L #9305, weight-average molecular weight: 1,000,000) containing a PVDF-based resin (polyvinylidene fluoride-hexafluoropropylene copolymer) was prepared as a coating solution 1. The coating solution 1 was applied by a doctor blade method to the porous film 1 so that the PVDF-based resin in the coating solution weighed 6.0 g per square meter.

The resultant coated product was immersed in 2-propanol while the coating film was wet with the solvent, and was then left to stand still at −10° C. for 5 minutes. This produced a laminated porous film 1. The laminated porous film 1 thus obtained was further immersed in another 2-propanol while the laminated porous film 1 was wet with the above immersion solvent, and was then left to stand still at 25° C. for 5 minutes. This produced a laminated porous film 1a. The laminated porous film 1a thus obtained was dried at 130° C. for 5 minutes. This produced a laminated separator 1 in which a porous layer was disposed on the porous film 1. Table 1 shows the results of evaluation of the laminated separator 1 thus obtained.

[Preparation of Nonaqueous Electrolyte Secondary Battery]

(Preparation of Positive Electrode Plate)

A positive electrode plate, which was produced by coating an aluminum foil with $LiNi_{0.5}Mn_{0.3}Co_{0.2}O_2$/electrically conductive agent/PVDF (weight ratio 92:5:3), was used. The aluminum foil of the positive electrode plate was partially cut off so that (i) a positive electrode active material layer was present in an area of 45 mm×30 mm and (ii) the area was surrounded by an area which had a width of 13 mm and in which no positive electrode active material layer was present. A piece of the aluminum foil which was cut off was used as a positive electrode plate 1. The positive electrode active material layer had a thickness of 38 μm and a density of 2.50 g/cm³.

(Preparation of Negative Electrode Plate)

A negative electrode plate, which was produced by coating a copper foil with graphite/styrene-1,3-butadiene copolymer/sodium carboxymethyl cellulose (weight ratio 98:1:1), was used.

The copper foil of the negative electrode plate was partially cut off so that (i) a negative electrode active material layer was present in an area of 50 mm×35 mm and (ii) the area was surrounded by an area which had a width of mm and in which area no negative electrode active material layer was present. A piece of the copper foil which was cut off was used as a negative electrode plate 1. The negative electrode active material layer had a thickness of 38 Tim and a density of 1.49 g/cm³.

(Assembling of Nonaqueous Electrolyte Secondary Battery)

With use of the positive electrode plate 1, the negative electrode plate 1, and the laminated separator 1, a nonaqueous electrolyte secondary battery was prepared by the following method.

The positive electrode plate 1, the laminated separator 1 (in which the porous layer was facing the positive electrode side), and the negative electrode plate 1 were disposed (arranged) in this order in a laminate pouch. This produced a nonaqueous electrolyte secondary battery member 1. In so doing, the positive electrode plate 1 and the negative electrode plate 1 were arranged so that a main surface of the positive electrode active material layer of the positive electrode plate 1 was entirely included in a range of a main surface of the negative electrode active material layer of the negative electrode plate 1 (i.e., entirely covered by the main surface of the negative electrode active material layer of the negative electrode plate 1).

Subsequently, the nonaqueous electrolyte secondary battery member 1 was put into a bag prepared, in advance, with an aluminum layer and a heat seal layer which were disposed on each other. Then, 0.25 mL of nonaqueous electrolyte was put into the bag. The nonaqueous electrolyte had been prepared by dissolving $LiPF_6$ in a mixed solvent in which ethylene carbonate, ethyl methyl carbonate, and diethyl carbonate were mixed at a ratio of 3:5:2 (volume ratio), so that a concentration of the $LiPF_6$ would become 1 mol/L. The bag was then heat-sealed while the pressure inside the bag was reduced. This produced a nonaqueous electrolyte secondary battery 1.

Then, the nonaqueous electrolyte secondary battery 1 obtained by the above method was subjected to measurement of a charge capacity characteristic after high-rate discharge. Table 1 shows the results of the measurement.

Example 2

[Production of Nonaqueous Electrolyte Secondary Battery Laminated Separator]

Ultra-high molecular weight polyethylene powder (GUR4032, manufactured by Ticona Corporation) having a weight-average molecular weight of 4,970,000 and polyethylene wax (FNP-0115, manufactured by Nippon Seiro Co., Ltd.) having a weight-average molecular weight of 1,000 were mixed so that a resultant mixture would contain the ultra-high molecular weight polyethylene powder in an amount of 70.0% by weight and the polyethylene wax in an amount of 30.0% by weight. The total amount of the ultra-high molecular weight polyethylene powder and the polyethylene wax in the mixture was assumed to be 100 parts by weight. To the 100 parts by weight of the mixture, 0.4 parts by weight of an antioxidant (Irg1010, manufactured by Ciba Specialty Chemicals Inc.), 0.1 parts by weight of an antioxidant (P168, manufactured by Ciba Specialty Chemicals Inc.), and 1.3 parts by weight of sodium stearate were added. Then, calcium carbonate (manufactured by Maruo Calcium Co., Ltd.) having a BET specific surface area of 11.6 m²/g was further added so as to account for 36% by volume of the entire volume of the resultant mixture. Then, while the resultant mixture was in the form of powder, the mixture was mixed in a Henschel mixer. Then, the mixture was melted and kneaded with use of a twin screw kneading extruder. This produced a polyolefin resin composition.

Then, the polyolefin resin composition was rolled with use of a pair of rollers each having a surface temperature of 150° C. This produced a sheet of the polyolefin resin composition. This sheet was immersed in an aqueous hydrochloric acid solution (containing 4 mol/L of hydrochloric acid and 6.0% by weight of a nonionic surfactant) at 38° C., so that the calcium carbonate was removed. The resultant sheet was cleaned with water at 40° C. Subsequently, the sheet thus cleaned was stretched at a stretch ratio of 6.2 times at 105° C. with use of a tenter uniaxial stretching machine manufactured by Ichikin Co., Ltd. This produced a porous film 2. The porous film 2 thus obtained had (i) a thickness of 15.6 μm, (ii) a weight per unit area of 5.4 g/m², and (iii) a WI of 97.

As in Example 1, the porous film 2 was coated with the coating solution 1. The resultant coated product was immersed in 2-propanol while the coating film was wet with the solvent, and was then left to stand still at 25° C. for 5 minutes. This produced a laminated porous film 2. The laminated porous film 2 thus obtained was further immersed in another 2-propanol while the laminated porous film 2 was wet with the above immersion solvent, and was then left to stand still at 25° C. for 5 minutes. This produced a laminated porous film 2a. The laminated porous film 2a thus obtained was dried at 65° C. for 5 minutes. This produced a laminated separator 2 in which a porous layer was disposed on the porous film 2. Table 1 shows the results of evaluation of the laminated separator 2 thus obtained.

[Preparation of Nonaqueous Electrolyte Secondary Battery]

A nonaqueous electrolyte secondary battery was prepared as in Example 1 except that the laminated separator 2 was used instead of the laminated separator 1. The nonaqueous electrolyte secondary battery thus prepared was used as a nonaqueous electrolyte secondary battery 2.

Then, the nonaqueous electrolyte secondary battery 2 obtained by the above method was subjected to measurement of a charge capacity characteristic after high-rate discharge. Table 1 shows the results of the measurement.

Example 3

[Production of Nonaqueous Electrolyte Secondary Battery Laminated Separator]

Ultra-high molecular weight polyethylene powder (GUR4032, manufactured by Ticona Corporation) having a weight-average molecular weight of 4,970,000 and polyethylene wax (FNP-0115, manufactured by Nippon Seiro Co., Ltd.) having a weight-average molecular weight of 1,000 were mixed so that a resultant mixture would contain the ultra-high molecular weight polyethylene powder in an amount of 71.5% by weight and the polyethylene wax in an amount of 28.5% by weight. The total amount of the ultra-high molecular weight polyethylene powder and the polyethylene wax in the mixture was assumed to be 100 parts by weight. To the 100 parts by weight of the mixture, 0.4 parts by weight of an antioxidant (Irg1010, manufactured by Ciba Specialty Chemicals Inc.), 0.1 parts by weight of an antioxidant (P168, manufactured by Ciba Specialty Chemicals Inc.), and 1.3 parts by weight of sodium stearate were added. Then, calcium carbonate (manufactured by Maruo Calcium Co., Ltd.) having a BET specific surface area of 11.8 $m^2/g$ was further added so as to account for 37% by volume of the entire volume of the resultant mixture. Then, while the resultant mixture was in the form of powder, the mixture was mixed in a Henschel mixer. Then, the mixture was melted and kneaded with use of a twin screw kneading extruder. This produced a polyolefin resin composition.

Then, the polyolefin resin composition was rolled with use of a pair of rollers each having a surface temperature of 150° C. This produced a sheet of the polyolefin resin composition. This sheet was immersed in an aqueous hydrochloric acid solution (containing 4 mol/L of hydrochloric acid and 1.0% by weight of a nonionic surfactant) at 43° C., so that the calcium carbonate was removed. The resultant sheet was cleaned with water at 45° C. Subsequently, the sheet thus cleaned was stretched at a stretch ratio of 7.0 times at 100° C. with use of a tenter uniaxial stretching machine manufactured by Ichikin Co., Ltd. This produced a porous film 3. The porous film 3 thus obtained had (i) a thickness of 10.3 μm, (ii) a weight per unit area of 5.2 $g/m^2$, and (iii) a WI of 91.

As in Example 1, the porous film 3 was coated with the coating solution 1. The resultant coated product was immersed in 2-propanol while the coating film was wet with the solvent, and was then left to stand still at −5° C. for 5 minutes. This produced a laminated porous film 3. The laminated porous film 3 thus obtained was further immersed in another 2-propanol while the laminated porous film 3 was wet with the above immersion solvent, and was then left to stand still at 25° C. for 5 minutes. This produced a laminated porous film 3a. The laminated porous film 3a thus obtained was dried at 30° C. for 5 minutes. This produced a laminated separator 3 in which a porous layer was disposed on the porous film 3. Table 1 shows the results of evaluation of the laminated separator 3 thus obtained.

[Preparation of Nonaqueous Electrolyte Secondary Battery]

A nonaqueous electrolyte secondary battery was prepared as in Example 1 except that the laminated separator 3 was used instead of the laminated separator 1. The nonaqueous electrolyte secondary battery thus prepared was used as a nonaqueous electrolyte secondary battery 3.

Then, the nonaqueous electrolyte secondary battery 3 obtained by the above method was subjected to measurement of a charge capacity characteristic after high-rate discharge. Table 1 shows the results of the measurement.

Example 4

(Preparation of Positive Electrode Plate)

A surface of a positive electrode plate, identical to the positive electrode plate 1, which surface was located on a positive electrode active material layer side was rubbed 3 times with use of an abrasive cloth sheet (model number: TYPE AA GRIT No. 100) manufactured by Nagatsuka Abrasive Mfg. Co., Ltd. This produced a positive electrode plate 2. A positive electrode active material layer of the positive electrode plate 2 had a thickness of 38 μm and a porosity of 40%.

[Preparation of Nonaqueous Electrolyte Secondary Battery]

The negative electrode plate 1 was used as a negative electrode plate. A nonaqueous electrolyte secondary battery was prepared as in Example 1 except that (i) the laminated separator 3 was used instead of the laminated separator 1 and (ii) the positive electrode plate 2 was used as a positive electrode plate. The nonaqueous electrolyte secondary battery thus prepared was used as a nonaqueous electrolyte secondary battery 4.

Then, the nonaqueous electrolyte secondary battery 4 obtained by the above method was subjected to measurement of a charge capacity characteristic after high-rate discharge. Table 1 shows the results of the measurement.

Example 5

(Preparation of Positive Electrode Plate)

A surface of a positive electrode plate, identical to the positive electrode plate 1, which surface was located on a positive electrode active material layer side was rubbed 5 times with use of an abrasive cloth sheet (model number: TYPE AA GRIT No. 100) manufactured by Nagatsuka Abrasive Mfg. Co., Ltd. This produced a positive electrode plate 3. A positive electrode active material layer of the positive electrode plate 3 had a thickness of 38 μm and a porosity of 40%.

[Preparation of Nonaqueous Electrolyte Secondary Battery]

The negative electrode plate 1 was used as a negative electrode plate. A nonaqueous electrolyte secondary battery was prepared as in Example 1 except that (i) the laminated separator 3 was used instead of the laminated separator 1 and (ii) the positive electrode plate 3 was used as a positive electrode plate. The nonaqueous electrolyte secondary battery thus prepared was used as a nonaqueous electrolyte secondary battery 5.

Then, the nonaqueous electrolyte secondary battery 5 obtained by the above method was subjected to measurement of a charge capacity characteristic after high-rate discharge. Table 1 shows the results of the measurement.

Example 6

(Preparation of Negative Electrode Plate)

A surface of a negative electrode plate, identical to the negative electrode plate 1, which surface was located on a negative electrode active material layer side was rubbed 3 times with use of an abrasive cloth sheet (model number: TYPE AA GRIT No. 100) manufactured by Nagatsuka Abrasive Mfg. Co., Ltd. This produced a negative electrode plate 2. The negative electrode active material layer of the negative electrode plate 2 had a thickness of 38 µm and a porosity of 31%.

[Preparation of Nonaqueous Electrolyte Secondary Battery]

The positive electrode plate 1 was used as a positive electrode plate. A nonaqueous electrolyte secondary battery was prepared as in Example 1 except that (i) the laminated separator 3 was used instead of the laminated separator 1 and (ii) the negative electrode plate 2 was used as a negative electrode plate. The nonaqueous electrolyte secondary battery thus prepared was used as a nonaqueous electrolyte secondary battery 6.

Then, the nonaqueous electrolyte secondary battery 6 obtained by the above method was subjected to measurement of a charge capacity characteristic after high-rate discharge. Table 1 shows the results of the measurement.

Example 7

(Preparation of Negative Electrode Plate)

A surface of a negative electrode plate, identical to the negative electrode plate 1, which surface was located on a negative electrode active material layer side was rubbed 7 times with use of an abrasive cloth sheet (model number: TYPE AA GRIT No. 100) manufactured by Nagatsuka Abrasive Mfg. Co., Ltd. This produced a negative electrode plate 3. The negative electrode active material layer of the negative electrode plate 3 had a thickness of 38 µm and a porosity of 31%.

[Preparation of Nonaqueous Electrolyte Secondary Battery]

The positive electrode plate 1 was used as a positive electrode plate. A nonaqueous electrolyte secondary battery was prepared as in Example 1 except that (i) the laminated separator 3 was used instead of the laminated separator 1 and (ii) the negative electrode plate 3 was used as a negative electrode plate. The nonaqueous electrolyte secondary battery thus prepared was used as a nonaqueous electrolyte secondary battery 7.

Then, the nonaqueous electrolyte secondary battery 7 obtained by the above method was subjected to measurement of a charge capacity characteristic after high-rate discharge. Table 1 shows the results of the measurement.

Example 8

[Preparation of Porous Layer and Laminated Separator]

In N-methyl-2-pyrrolidone, a PVDF-based resin (manufactured by Arkema Inc.; product name "Kynar (registered trademark) LBG"; weight-average molecular weight of 590,000) was stirred and dissolved at 65° C. for 30 minutes so that a solid content would account for 10% by mass. A resultant solution was used as a binder solution. As a filler, alumina fine particles (manufactured by Sumitomo Chemical Co., Ltd.; product name "AKP3000"; silicon content: 5 ppm) was used. The alumina fine particles, the binder solution, and a solvent (N-methyl-2-pyrrolidone) were mixed together in the following proportion. That is, the alumina fine particles, the binder solution, and the solvent were mixed together so that (i) a resultant mixed solution would contain 10 parts by weight of the PVDF-based resin with respect to 90 parts by weight of the alumina fine particles and (ii) a solid content concentration (alumina fine particles+PVDF-based resin) of the mixed solution would account for 10% by weight. This produced a dispersion liquid. The dispersion liquid was applied by a doctor blade method to the porous film 3 prepared in Example 3, so that the PVDF-based resin in the dispersion liquid weighed 6.0 g per square meter. This produced a laminated porous film 8. The laminated porous film 8 was dried at 65° C. for 5 minutes. This produced a laminated separator 8. The laminated porous film 3 was dried such that (i) the direction of the hot air was perpendicular to the porous film 3 and (ii) the velocity of the hot air was 0.5 m/s. Table 1 shows the results of evaluation of the laminated separator 8 thus obtained.

[Preparation of Nonaqueous Electrolyte Secondary Battery]

A nonaqueous electrolyte secondary battery was prepared as in Example 1 except that the laminated separator 8 was used instead of the laminated separator 1. The nonaqueous electrolyte secondary battery thus prepared was used as a nonaqueous electrolyte secondary battery 8.

Then, the nonaqueous electrolyte secondary battery 8 obtained by the above method was subjected to measurement of a charge capacity characteristic after high-rate discharge. Table 1 shows the results of the measurement.

Comparative Example 1

(Preparation of Positive Electrode Plate)

A surface of a positive electrode plate, identical to the positive electrode plate 1, which surface was located on a positive electrode active material layer side was rubbed 10 times with use of an abrasive cloth sheet (model number: TYPE AA GRIT No. 100) manufactured by Nagatsuka Abrasive Mfg. Co., Ltd. This produced a positive electrode plate 4. A positive electrode active material layer of the positive electrode plate 4 had a thickness of 38 µm and a porosity of 40%.

[Preparation of Nonaqueous Electrolyte Secondary Battery]

The negative electrode plate 1 was used as a negative electrode plate. A nonaqueous electrolyte secondary battery was prepared as in Example 1 except that (i) the laminated separator 3 was used instead of the laminated separator 1 and (ii) the positive electrode plate 4 was used as a positive electrode plate. The nonaqueous electrolyte secondary battery thus obtained was used as a nonaqueous electrolyte secondary battery 9.

Then, the nonaqueous electrolyte secondary battery 9 obtained by the above method was subjected to measurement of a charge capacity characteristic after high-rate discharge. Table 1 shows the results of the measurement.

Comparative Example 2

(Preparation of Negative Electrode Plate)

A surface of a negative electrode plate, identical to the negative electrode plate 1, which surface was located on a negative electrode active material layer side was rubbed 10 times with use of an abrasive cloth sheet (model number:

TYPE AA GRIT No. 100) manufactured by Nagatsuka Abrasive Mfg. Co., Ltd. This produced a negative electrode plate 4. The negative electrode active material layer of the negative electrode plate 4 had a thickness of 38 μm and a porosity of 31%.

[Preparation of Nonaqueous Electrolyte Secondary Battery]

The positive electrode plate 1 was used as a positive electrode plate. A nonaqueous electrolyte secondary battery was prepared as in Example 1 except that (i) the laminated separator 3 was used instead of the laminated separator 1 and (ii) the negative electrode plate 4 was used as a negative electrode plate. The nonaqueous electrolyte secondary battery thus obtained was used as a nonaqueous electrolyte secondary battery 10.

Then, the nonaqueous electrolyte secondary battery 10 obtained by the above method was subjected to measurement of a charge capacity characteristic after high-rate discharge. Table 1 shows the results of the measurement.

Comparative Example 3

[Preparation of Nonaqueous Electrolyte Secondary Battery Separator]

A coated product obtained as in Example 3 was immersed in 2-propanol while the coating film was wet with the solvent, and was then left to stand still at −78° C. for 5 minutes. This produced a laminated porous film 11. The laminated porous film 11 thus obtained was further immersed in another 2-propanol while the laminated porous film 11 was wet with the above immersion solvent, and was then left to stand still at 25° C. for 5 minutes. This produced a laminated porous film 11a. The laminated porous film 11a thus obtained was dried at 30° C. for 5 minutes. This produced a laminated separator 11 in which a porous layer was disposed on the porous film 3. Table 1 shows the results of evaluation of the laminated separator 11 thus obtained.

[Preparation of Nonaqueous Electrolyte Secondary Battery]

A nonaqueous electrolyte secondary battery was prepared as in Example 1 except that the laminated separator 11 was used as a nonaqueous electrolyte secondary battery separator. The nonaqueous electrolyte secondary battery thus obtained was used as a nonaqueous electrolyte secondary battery 11.

Then, the nonaqueous electrolyte secondary battery 11 obtained by the above method was subjected to measurement of a charge capacity characteristic after high-rate discharge. Table 1 shows the results of the measurement.

TABLE 1

| | Separator | Electrode | | Battery Charging |
|---|---|---|---|---|
| | Porous layer PVDF α rate (mol %) | Positive electrode plate Capacitance (nF) | Negative electrode plate Capacitance (nF) | characteristic Charge capacity (mAh) after high-rate discharge |
| Example 1 | 59.6 | 2.1 | 4.7 | 16.7 |
| Example 2 | 80.8 | 2.1 | 4.7 | 17.3 |
| Example 3 | 44.4 | 2.1 | 4.7 | 15.4 |
| Example 4 | 44.4 | 60 | 4.7 | 16.7 |
| Example 5 | 44.4 | 935 | 4.7 | 15.6 |
| Example 6 | 44.4 | 2.1 | 274 | 16.2 |
| Example 7 | 44.4 | 2.1 | 7400 | 15.7 |
| Example 8 | 64.3 | 2.1 | 4.7 | 16.9 |

TABLE 1-continued

| | Separator | Electrode | | Battery Charging |
|---|---|---|---|---|
| | Porous layer PVDF α rate (mol %) | Positive electrode plate Capacitance (nF) | Negative electrode plate Capacitance (nF) | characteristic Charge capacity (mAh) after high-rate discharge |
| Comparative Example 1 | 44.4 | 4090 | 4.7 | 12.8 |
| Comparative Example 2 | 44.4 | 2.1 | 9050 | 12.3 |
| Comparative Example 3 | 34.6 | 2.1 | 4.7 | 12.1 |

As shown in Table 1, the nonaqueous electrolyte secondary batteries produced in Examples 1 through 8 each had an after-high-rate-discharge charge capacity characteristic superior to those of the nonaqueous electrolyte secondary batteries produced in Comparative Examples 1 through 3.

It was therefore found that a charge capacity characteristic of a nonaqueous electrolyte secondary battery after high-rate discharge can be improved by causing the nonaqueous electrolyte secondary battery to satisfy the following 3 requirements (i) through (iii): (i) a polyvinylidene fluoride-based resin contained in a porous layer contains an α-form polyvinylidene fluoride-based resin in an amount of not less than 35.0 mol % with respect to 100 mol % of the total amount of (i) the α-form polyvinylidene fluoride-based resin and (ii) a β-form polyvinylidene fluoride-based resin contained in the polyvinylidene fluoride-based resin, (ii) a positive electrode plate has a capacitance of 1 nF to 1000 nF per measurement area of 900 $mm^2$, and (iii) a negative electrode plate has a capacitance of 4 nF to 8500 nF per measurement area of 900 $mm^2$.

INDUSTRIAL APPLICABILITY

A nonaqueous electrolyte secondary battery in accordance with an embodiment of the present invention is excellent in a charge capacity characteristic after high-rate discharge. It is therefore possible to suitably use the nonaqueous electrolyte secondary battery as a battery for, for example, a personal computer, a mobile phone, a mobile information terminal, and a vehicle.

The invention claimed is:

1. A nonaqueous electrolyte secondary battery comprising:
   a nonaqueous electrolyte secondary battery separator containing a polyolefin porous film;
   a porous layer containing a polyvinylidene fluoride-based resin;
   a positive electrode plate having a capacitance of 1 nF to 1000 nF per measurement area of 900 $mm^2$; and
   a negative electrode plate having a capacitance of 4 nF to 8500 nF per measurement area of 900 $mm^2$,
   the porous layer being provided between the nonaqueous electrolyte secondary battery separator and at least one of the positive electrode plate and the negative electrode plate, and
   the polyvinylidene fluoride-based resin containing an α-form polyvinylidene fluoride-based resin in an amount of not less than 35.0 mol % with respect to 100 mol % of a total amount of (i) the α-form polyvinylidene fluoride-based resin and (ii) a β-form polyvinylidene fluoride-based resin contained in the polyvinylidene fluoride-based resin, where the amount of α-form polyvinylidene fluoride-based resin contained is calculated from (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum.

2. The nonaqueous electrolyte secondary battery as set forth in claim 1, wherein the positive electrode plate contains a transition metal oxide.

3. The nonaqueous electrolyte secondary battery as set forth in claim 1, wherein the negative electrode plate contains graphite.

4. The nonaqueous electrolyte secondary battery as set forth in claim 1, further comprising:

another porous layer which is provided between (i) the nonaqueous electrolyte secondary battery separator and (ii) at least one of the positive electrode plate and the negative electrode plate.

5. The nonaqueous electrolyte secondary battery as set forth in claim 4, wherein the another porous layer contains at least one resin selected from the group consisting of a polyolefin, a (meth)acrylate-based resin, a fluorine-containing resin (excluding a polyvinylidene fluoride-based resin), polyamide-based resin, a polyester-based resin, and a water-soluble polymer.

6. The nonaqueous electrolyte secondary battery as set forth in claim 5, wherein the polyamide-based resin is an aramid resin.

* * * * *